(12) United States Patent
Dowski, Jr. et al.

(10) Patent No.: US 7,860,699 B2
(45) Date of Patent: *Dec. 28, 2010

(54) SYSTEM AND METHOD FOR OPTIMIZING OPTICAL AND DIGITAL SYSTEM DESIGNS

(75) Inventors: Edward R. Dowski, Jr., Lafayette, CO (US); Gregory E. Johnson, Boulder, CO (US); Kenneth S. Kubala, Boulder, CO (US); Kenneth Ashley Macon, Longmont, CO (US); Goran M. Rauker, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/341,359

(22) Filed: Dec. 22, 2008

(65) Prior Publication Data
US 2009/0143874 A1 Jun. 4, 2009

Related U.S. Application Data

(63) Continuation of application No. 11/000,819, filed on Dec. 1, 2004, now Pat. No. 7,469,202.

(60) Provisional application No. 60/526,216, filed on Dec. 1, 2003.

(51) Int. Cl.
*G06G 7/48* (2006.01)
*G06G 7/62* (2006.01)
*G06F 17/50* (2006.01)
*G02B 27/44* (2006.01)
*G02B 27/46* (2006.01)
*G02B 27/14* (2006.01)

(52) U.S. Cl. .............................. 703/13; 703/6; 359/563; 359/637

(58) Field of Classification Search .................... 703/6, 703/13; 359/563, 637
See application file for complete search history.

(56) References Cited

U.S. PATENT DOCUMENTS 4,837,451 A    6/1989    Pinson (Continued)

FOREIGN PATENT DOCUMENTS

WO    WO 99/35529    7/1999

(Continued)

OTHER PUBLICATIONS

Chinese Application No. 200810131277.2, Office Action, Sep. 18, 2009, 12 pages.

(Continued)

*Primary Examiner*—Qing Wu
(74) *Attorney, Agent, or Firm*—Lathrop & Gage LLP

(57) ABSTRACT

A software product includes instructions stored on computer-readable media, that when executed by a computer, perform steps for optimizing an optical system design and a digital system design. The instructions are for simulating an optical model of the optical system design, simulating a digital model of the digital system design, analyzing simulated output of the optical model and simulated output of the digital model, to produce a score, modifying the optical model and the digital model, based upon the score, controlling re-execution of the instructions for simulating the optical model, the instructions for simulating the digital model, the instructions for analyzing and the instructions for modifying to produce an optimized optical model and an optimized digital model, and outputting predicted performance of the optimized optical and digital models.

20 Claims, 20 Drawing Sheets

U.S. PATENT DOCUMENTS

| | | | |
|---|---|---|---|
| 4,928,300 | A | 5/1990 | Ogawa et al. |
| 4,938,596 | A | 7/1990 | Gauthier et al. |
| 5,002,380 | A | 3/1991 | Aprahamian |
| 5,168,375 | A | 12/1992 | Reisch et al. |
| 5,179,273 | A | 1/1993 | Lisson et al. |
| 5,221,834 | A | 6/1993 | Lisson et al. |
| 5,291,560 | A | 3/1994 | Daugman |
| 5,521,695 | A | 5/1996 | Cathey, Jr. et al. |
| 5,555,128 | A | 9/1996 | Khoury et al. |
| 5,610,707 | A | 3/1997 | Duncan et al. |
| 5,710,839 | A | 1/1998 | Cok |
| 5,748,371 | A | 5/1998 | Cathey, Jr. et al. |
| 5,751,340 | A | 5/1998 | Strobl et al. |
| 5,828,867 | A | 10/1998 | Pennell |
| 5,870,179 | A | 2/1999 | Cathey, Jr. et al. |
| 5,966,216 | A | 10/1999 | Galburt et al. |
| 6,052,524 | A | 4/2000 | Pauna |
| 6,069,738 | A | 5/2000 | Cathey, Jr. et al. |
| 6,107,617 | A | 8/2000 | Love et al. |
| 6,111,840 | A | 8/2000 | Hajjar |
| 6,343,307 | B1 | 1/2002 | Mendlovic et al. |
| 6,519,501 | B2 | 2/2003 | Pierrat et al. |
| 6,525,302 | B2 | 2/2003 | Dowski et al. |
| 6,674,519 | B2 | 1/2004 | Mui |
| 6,813,593 | B1 | 11/2004 | Berger |
| 6,895,136 | B2 | 5/2005 | Delwala |
| 7,061,693 | B2 | 6/2006 | Zalevsky |
| 7,117,140 | B2 | 10/2006 | Toyama |
| 7,269,809 | B2 | 9/2007 | Shastri et al. |
| 2002/0118457 | A1 | 8/2002 | Dowski, Jr. |
| 2002/0134921 | A1 | 9/2002 | Cathey, Jr. |
| 2003/0115028 | A1 | 6/2003 | Summerfield et al. |
| 2003/0127584 | A1 | 7/2003 | Dowski, Jr. et al. |
| 2003/0142877 | A1 | 7/2003 | George et al. |
| 2003/0169944 | A1 | 9/2003 | Dowski, Jr. et al. |
| 2004/0145808 | A1 | 7/2004 | Cathey, Jr. et al. |
| 2004/0165253 | A1 | 8/2004 | Cathey, Jr. et al. |
| 2004/0190762 | A1 | 9/2004 | Dowski, Jr. et al. |
| 2004/0228005 | A1 | 11/2004 | Dowski, Jr. |
| 2004/0247196 | A1 | 12/2004 | Chanas et al. |
| 2004/0257543 | A1 | 12/2004 | Dowski, Jr. et al. |
| 2005/0049843 | A1 | 3/2005 | Hewitt et al. |
| 2005/0088745 | A1 | 4/2005 | Cathey, Jr. et al. |
| 2005/0275953 | A1 | 12/2005 | George et al. |
| 2006/0050409 | A1 | 3/2006 | George et al. |
| 2007/0040828 | A1 | 2/2007 | Zalevsky et al. |

FOREIGN PATENT DOCUMENTS

| | | |
|---|---|---|
| WO | WO 99/57599 | 11/1999 |
| WO | WO00/72267 | 11/2000 |
| WO | WO 01/99431 A3 | 12/2001 |
| WO | WO 02/19723 | 3/2002 |
| WO | WO 03/052492 | 3/2002 |
| WO | WO 02/052331 A | 7/2002 |
| WO | WO 02/057832 A3 | 7/2002 |
| WO | WO 02/019723 | 12/2002 |
| WO | WO 02/099511 | 12/2002 |
| WO | WO/03/005733 | 1/2003 |
| WO | WO 03/009041 A3 | 1/2003 |
| WO | WO 03/021333 A1 | 3/2003 |
| WO | WO03/021373 | 3/2003 |
| WO | WO03/073153 | 9/2003 |
| WO | WO 03/073153 A1 | 9/2003 |
| WO | WO2004/063989 | 7/2004 |
| WO | WO2006/028527 | 3/2006 |
| WO | WO2006/097916 | 9/2006 |

OTHER PUBLICATIONS

He, Jing, Summary Translation of Response to Office Action in Chinese Application No. 200810131277.2, Sep. 28, 2010, 2 pages.

Chinese Application No. 200810131277.2, Notice of Grant dated May 17, 2010, with concise explanation of relevance, 3 pages.

Schuhmann, et al., "Enhancements in The Optimisation Process In Lens Design (I)" Proceedings of the SPIE, Current Developments in Lens Design and Optical Engineering II, vol. 4441, Dec. 2001, pp. 30-36.

Adams, et al., "Enhancements in The Optimisation Process In Lens Design (II)" Proceedings of the SPIE, Current Developments in Lens Design and Optical Engineering II, vol. 4441, Dec. 2001, pp. 37-42.

Alter-Gartenberg, "Information Metric As a Design Tool for Optoelectronic Imaging Systems" Applied Optics, vol. 39, No. 11, Apr. 10, 2000, pp. 1743-1760.

Poon, et al., "Optical/digital incoherent image processing for extended depth of field", Appl. Opt. vol. 26 (21), Nov. 1, 1987, pp. 4612-4615.

Van Der Gracht et al., "Broadband behavior of an optical-digital focus-invariant system," Opt. Lett., vol. 21 (13), Jul. 1, 1996, pp. 919-921.

Dowski et al., "Wavefront Coding: A Modern Method of Achieving High Performance and/or Low Cost Imaging Systems", Proceedings of the SPIE, vol. 3779, Jul. 1999, pp. 137-145.

Dowski et al., "Wavefront Coding for Detection and Estimation with a Single-Lens Incoherent Optical System", Proceedings of the International Conference on Acoustics, Speech and Signal Processing (ICASSP), May 1995, vol. 4, conf. 20, pp. 2451-2454.

Van Den Berg, "Wavefront Coding Keeps a Focus on Applications", Opto & Laser Europe, Oct. 2003, http://optics.org/articles/ole/8/10/5.

Dowski et al., "Aberration Invariant Optical/Digital Incoherent Systems", Optical Review, vol. 3, No. 6A, Sep. 30, 1996, pp. 429-432.

Dowski, Jr. et al., "Wavefront Coding: jointly optimized optical and digital imaging systems," Visual Information Processing IX, S.K. Park and Z. Rahman, ed., Proc. SPIE vol. 4041 (2000), pp. 114-120.

Kubala et al., "Reducing Complexity in Computational Imaging Systems," Optics Express, vol. 11, No. 18, Sep. 8, 2003, pp. 2102-2108.

Johnson et al., "Computational Imaging Design Tools and Methods," SPIE, Jul. 1, 2004, pp. 5524-5531.

Daugman, John, "Demodulation by Complex-Valued Wavelets for Stochastic Pattern Recognition", International Journal of Wavelets, Multiresolution and Information Processing, pp. 1-17, vol. 1., Jan. 14, 2003.

Wach, Hans B., et al. "Control of Chromatic Focal Shift Through Wave-Front Coding." Applied Optics, Optical Society of America, Washington, US. vol. 37, No. 23, pp. 5359-5367, Aug. 10, 1998.

Bradburn, Sara, et al. "Realizations of Focus Invariance in Optical-Digital Systems with Wave-Front Coding." Applied Optics, Optical Society of America, Washington, US. vol. 36, No. 5, pp. 9157-9166, Dec. 10, 1997.

Wach, Hans B., et al. "Channel Reduction and Applications to Image Processing," Applied Optics, Optical Society of America, Washington, US. vol. 37, No. 23, pp. 5359-5367, Apr. 10, 2000.

Dowski, Jr., Edward, et al. "Marrying Optics & Electronics," Spie's OE Magazine, pp. 42-43, Jan. 2002.

Dowski, Jr., Edward, et al. "Wavefront Coding: A Modern Method of Achieving High perfomrance and/or Low Cost Imaging Systems," SPIE Conference on Current Developments in Optical Design and Optical Engineering VIII, Denver Colorado, SPIE vol. 3779, pp. 137-145, Jul. 1999.

Eun et al., "An efficient 2-D convolver chip for real-time image processing", Proceedings of the Design Automation Conference 1998 (IEEE), pp. 329-330.

Related PCT Application Serial No. PCT/US03/06289, International Search Report dated Jul. 15, 2003.

Related European Application Serial No. 03711338, Preliminary Amendment filed upon entry dated Sep. 8, 2004.

Related European Application Serial No. 03711338, 109 and 110 Notice dated Oct. 5, 2004.

Related European Application Serial No. 03711338, Response to 109 and 110 Notice filed Nov. 5, 2004.

Related European Application Serial No. 03711338, Article 92(2) issued Oct. 14, 2005.

Related European Application Serial No. 03711338, Response to 92(2) filed Apr. 21, 2006.

Related European Application Serial No. 03711338, Notice of Grant issued May 15, 2007.

Wach, Patrick, International Search Report and Written Opinion issued in related application PCT/US2004/040218, dated Aug. 11, 2005.

Response to Written Opinion in related application PCT/US2004/040218 dated Nov. 3, 2005.

Wach, Patrick, Informal Communication in related application PCT/US2004/040218 dated Mar. 16, 2006.

Response to Notification Concerning Informal Communication in related application PCT/US2004/040218 dated Apr. 13, 2006.

Wach, Patrick, International Preliminary Report on Patentability in related application PCT/US2004/040218 dated May 24, 2006.

Ward, Seamus; European Office Action issued in related application EP 04812670.0, dated Mar. 16, 2007.

Select File History for U.S. Appl. No. 11/000,819, dated Feb. 6, 2007 through Aug. 20, 2008.

FIG. 8     *PARALLEL OPERATIONS*

DISTRIBUTED PROCESSING

FIG. 10    GENERALIZED OPTICAL SYSTEM

FIG. 11  GENERALIZED OPTICAL SYSTEM

FIG. 12   ANTI-REFLECTION

SYSTEM AND METHOD FOR OPTIMIZING OPTICAL AND DIGITAL SYSTEM DESIGNS

CROSS-REFERENCE TO RELATED APPLICATIONS

This application is a continuation application of commonly-owned and U.S. patent application Ser. No. 11/000,819, filed on Dec. 1, 2004, now U.S. Pat. No. 7,469,202 and entitled System and Method for Optimizing Optical and Digital System Designs, which claims priority to U.S. Provisional Patent Application No. 60/526,216, filed on Dec. 1, 2003, and entitled Designing Optical Imaging Systems with Wavefront Coding Elements. The above-referenced patent applications are incorporated herein by reference.

BACKGROUND

Electro-optical systems often have a variety of optical, electronic and mechanical elements; these elements sometimes form separate sub-systems. By way of example, electro-optical systems such as digital and cell phone cameras include optical elements (e.g., lens elements) that form an optical sub-system and electronic elements (e.g., signal processors) that form a digital sub-system. These sub-systems cooperate to capture an optical image and produce a digital picture, for example.

Designing the electro-optical system to perform one or more intended purposes may be a difficult task. In order to meet design goals, the electro-optical system is often over-designed, adding cost and development time to the design process. Further, when an electro-optical system includes both optical and digital sub-systems, these sub-systems are designed and optimized independently. Typically, for example, the prescription for the optical sub-system is selected and optimized first, and then the signal-processing sub-system is separately designed based upon the output from the optical sub-system.

Commercially available software design packages may be used in developing the foregoing prior art electro-optical systems. For example, the optical sub-system may be designed and optimized using Zemax from Zemax Development Corp. or CODE-V from Optical Research Associates. The digital sub-system may be designed using MATLAB by MathWorks Inc., or customized C/C++ code for example.

SUMMARY

In one embodiment, a software product has instructions stored on computer-readable media, wherein the instructions, when executed by a computer, perform steps for optimizing an optical system design and a digital system design. The software product includes instructions for simulating an optical model of the optical system design, instructions for simulating a digital model of the digital system design, instructions for analyzing simulated output of the optical model and simulated output of the digital model, to produce a score, and instructions for modifying the optical model and digital model based upon the score.

In another embodiment, a software product has instructions stored on computer-readable media, wherein the instructions, when executed by a computer, perform steps for optimizing optical system design with wavefront coding. The software product includes instructions for simulating an optical model of the optical system design, instructions for analyzing simulated output of the optical model to produce a score, and instructions for modifying the optical model, including implementing phase-modifying optics within the optical model, based upon the score.

In another embodiment, a method optimizes optical and digital system designs. An optical model of the optical system design is generated. A digital model of the digital system design is generated. Simulated output of the optical and digital models is analyzed to produce a score. The score is processed to determine whether the simulated output achieves one or more goals. One or more properties of at least one of the optical model and the digital model is modified if the goals are not achieved. The analyzing, processing and modifying steps are repeated until the goals are achieved, and an optimized optical system design and optimized digital system design are generated from the optical and digital models.

In another embodiment, a system optimizes optical and digital system designs. The system has an optical model of the optical system design, a digital model of the digital system design, an optical simulator for simulating the optical model, a digital simulator for simulating the digital model, an analyzer for analyzing simulated output of the optical and digital models to generate a score, and an optimizer for modifying the optical and digital models based upon the score.

DETAILED DESCRIPTION OF THE FIGURES

Figure 1:
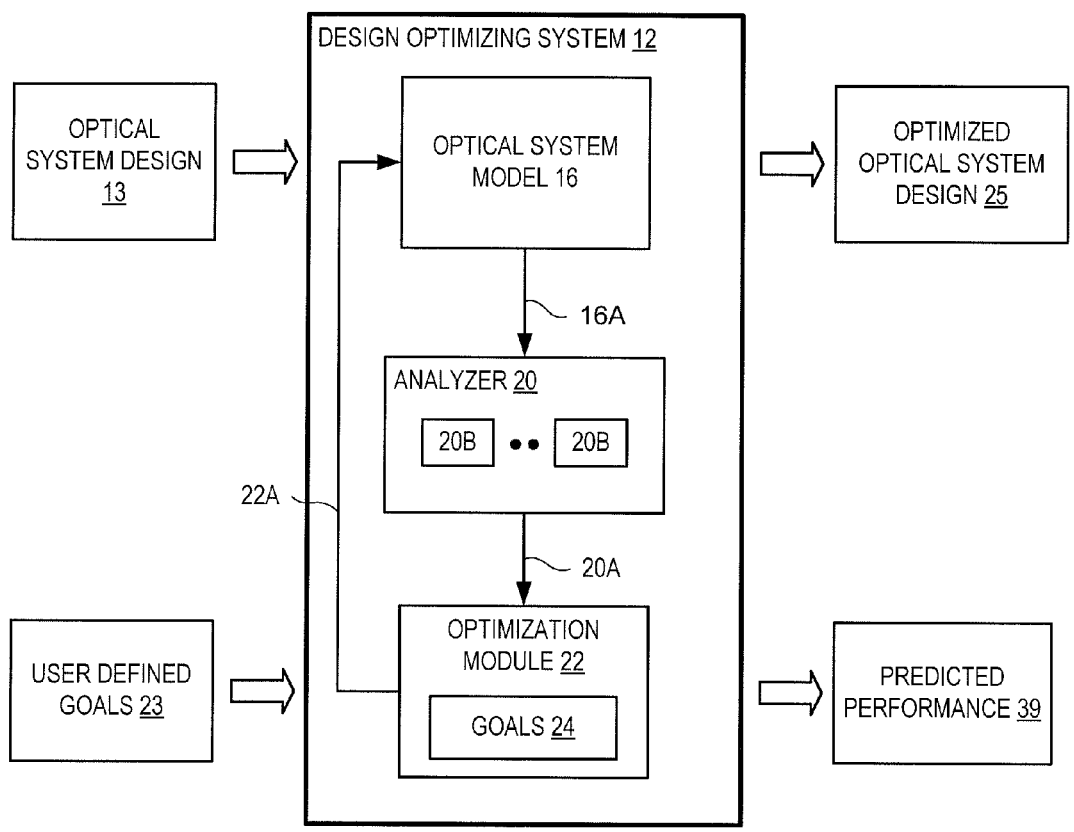
FIG. 1 shows one exemplary system embodiment for optimizing an optical system design.

An optical system design described below includes one or more optical design objects (e.g., lenses, mirrors) that, when manufactured, modify a wavefront of electromagnetic radiation from an object. The wavefront defines a region of constant phase of the electromagnetic radiation from a single point of the object. Electromagnetic radiation may have a wavelength in the visible light range, for example, or it may comprise other spectrums, e.g., radio frequency, microwave, infrared, ultraviolet, x-ray and cosmic ray ranges.

An optical system design may specify an optical imaging system that focuses the wavefront to a focal plane, to image the object to the focal plane. A focal plane array (e.g., a CCD, CMOS or microbolometer array) or detector positioned at the focal plane may then be used to capture the image. Electronics (e.g., a computer) coupled with the focal plane may then digitally process the captured image to generate a final image. The optical imaging system together with the focal plane array and electronics may thus form an electro-optical system. The combination of the focal plane array and electronics may comprise integrated circuits, field programmable gate arrays (FPGAs), digital signal processors (DSPs) and/or software in a desktop computer; digital processing by the focal plane array and electronics is thus sometimes denoted herein as a "digital system." A digital system design may describe the digital processing of the digital system.

Materials sensitive to the electromagnetic radiation may be positioned at the focal plane instead of a focal plane array or detector, as in the case of photoresist material used in lithographic applications. Other exemplary detectors at the focal plane may include an optical viewer or a retina, depending on the application. An optical and/or digital system design may therefore also specify different types of detectors or materials.

An optical and/or digital system design may alternatively specify a "task based" optical-digital system, which is for example a computer output or state used in human visualization, machine vision or processing, bar code decoding, optical character recognition or biometrics. A task based optical-digital system may not form a human-interpretable image; or, if it does, that image may be unconnected to the utility of the task or may be reduced to the minimum amount of information necessary to complete the task.

An optical system design may further specify mechanical objects, such as an optical housing, to couple optical elements together. Baffling is another type of mechanical object that may be specified by the optical system design, to reduce stray light within the optical system. Mechanical objects may further specify a housing that couples the focal plane array and/or electronics to the optical system; in this case, the mechanical objects are typically specified with defined tolerance so that, for example, the focal plane array is accurately positioned at the focal plane to capture a clear image.

The optical system design may specify an optical system that processes multiple wavefronts, such as when optics within the optical system form two or more focal planes or when the optical system captures or processes reflected radiation.

An optical system design may further specify "phase-modifying optics" (e.g., one or more lenses, lens surfaces, holograms, mirrored surfaces, three-dimensional phase elements, diffractive optics, etc.) that modify phase of the wavefronts processed by the optical system. The phase-modifying optics serve to make formed images less sensitive to effects such as misfocus and/or misfocus related aberrations. In one example, the phase-modifying optics include an optical surface on one optical element that modifies phase of the wavefront such that an optical transfer function ("OTF") of the optical imaging system, at a focal plane, is substantially invariant to the misfocus and/or one or more misfocus-related aberrations. "Substantially invariant" means, for example, that the OTF of the optical imaging system does not vary to the extent that it degrades or inhibits the ability of the optical system to render a final image or complete a task that the system is intended and/or is sufficient to perform. In another example, substantially invariant may mean that there are no zeros within the frequency passband detected by the focal plane array or a subband thereof that is required for the digital processing. In another example, substantially invariant may mean that the changes in the spatial domain are smaller than the physical pixel size of the focal plane array, and therefore cannot be detected at all.

The optical-digital system design is designed to meet one or more goals. Exemplary goals include the quality of the image formed by the optical system or the task-based utility of output from the system. A goal may also include one or more objects or parameters of the optical system, as defined in more detail below. An exemplary goal may be that the optical system meets certain cost or size requirements.

As described in more detail below, a design object of the optical system design may specify a physical part (e.g., a lens) of the optical imaging system. A parameter of the optical system design may specify a physical and/or economic characteristic (e.g., cost) of one or more design objects. Parameters of a design object may therefore specify size, material, material properties, temporal and spatial coherence properties, wavelength (emission, absorption), location and/or shape, for example.

An optical system design processed by a computer is sometimes denoted herein as an optical system model. Similarly, the computer may process a digital system design to generate a digital system model. Software design tools may be used by the computer to generate these models. Parameters of the models may be designated as "variables" with varying range depending on optical, signal processing, mechanical, environmental and/or other factors (e.g., cost).

The following patents and patent applications are incorporated herein by reference: U.S. Pat. No. 5,748,371, entitled EXTENDED DEPTH OF FIELD OPTICAL SYSTEMS; U.S. application Ser. No. 10/813,993, entitled SYSTEMS AND METHODS FOR MINIMIZING ABERRATING EFFECTS IN IMAGING SYSTEMS; and U.S. application Ser. No. 10/376,924, entitled OPTIMIZED IMAGE PROCESSING FOR WAVEFRONT CODED IMAGING SYSTEMS.

Figure 3:
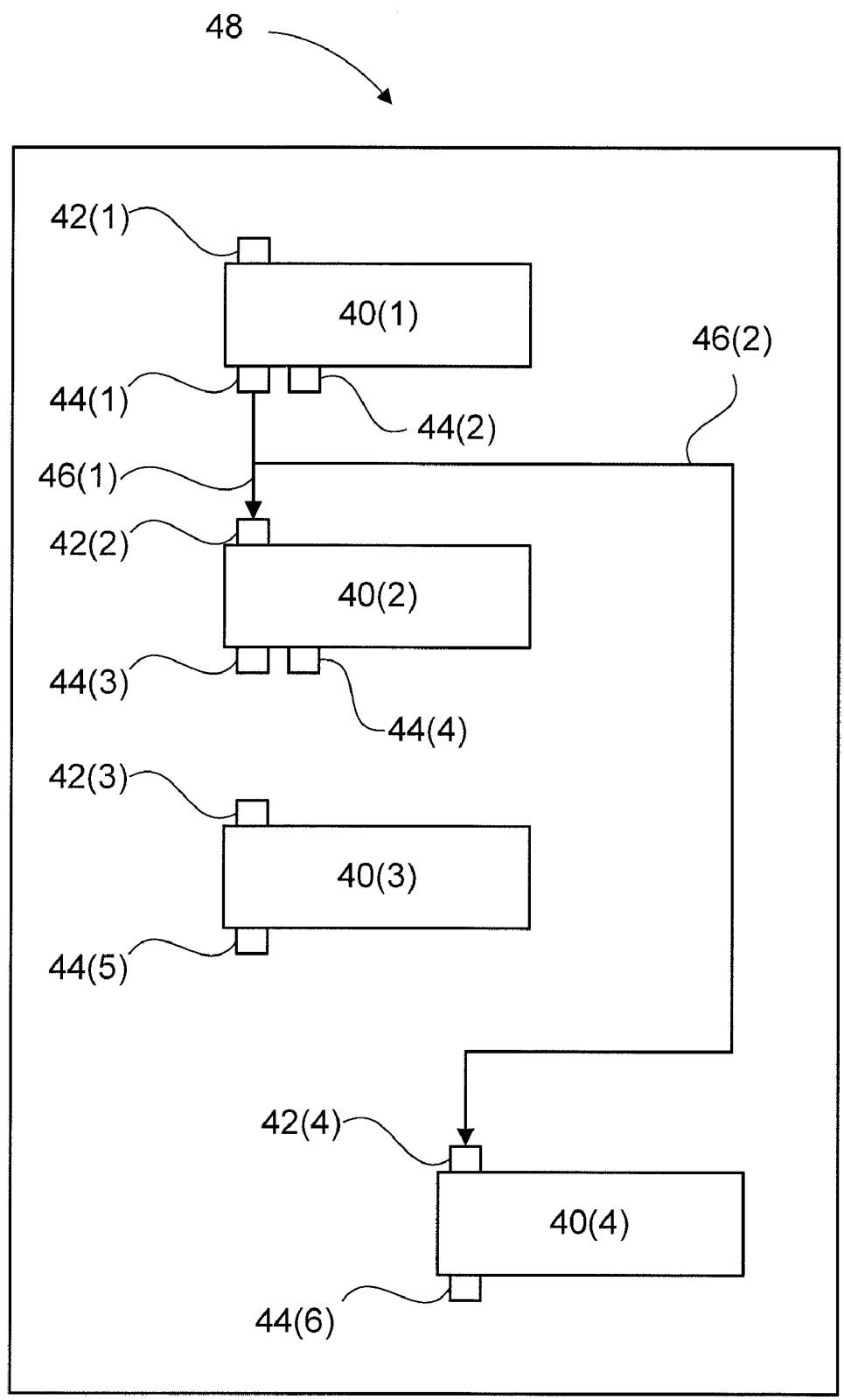
FIG. 3 illustrates workspace operation of components.
Figure 4:
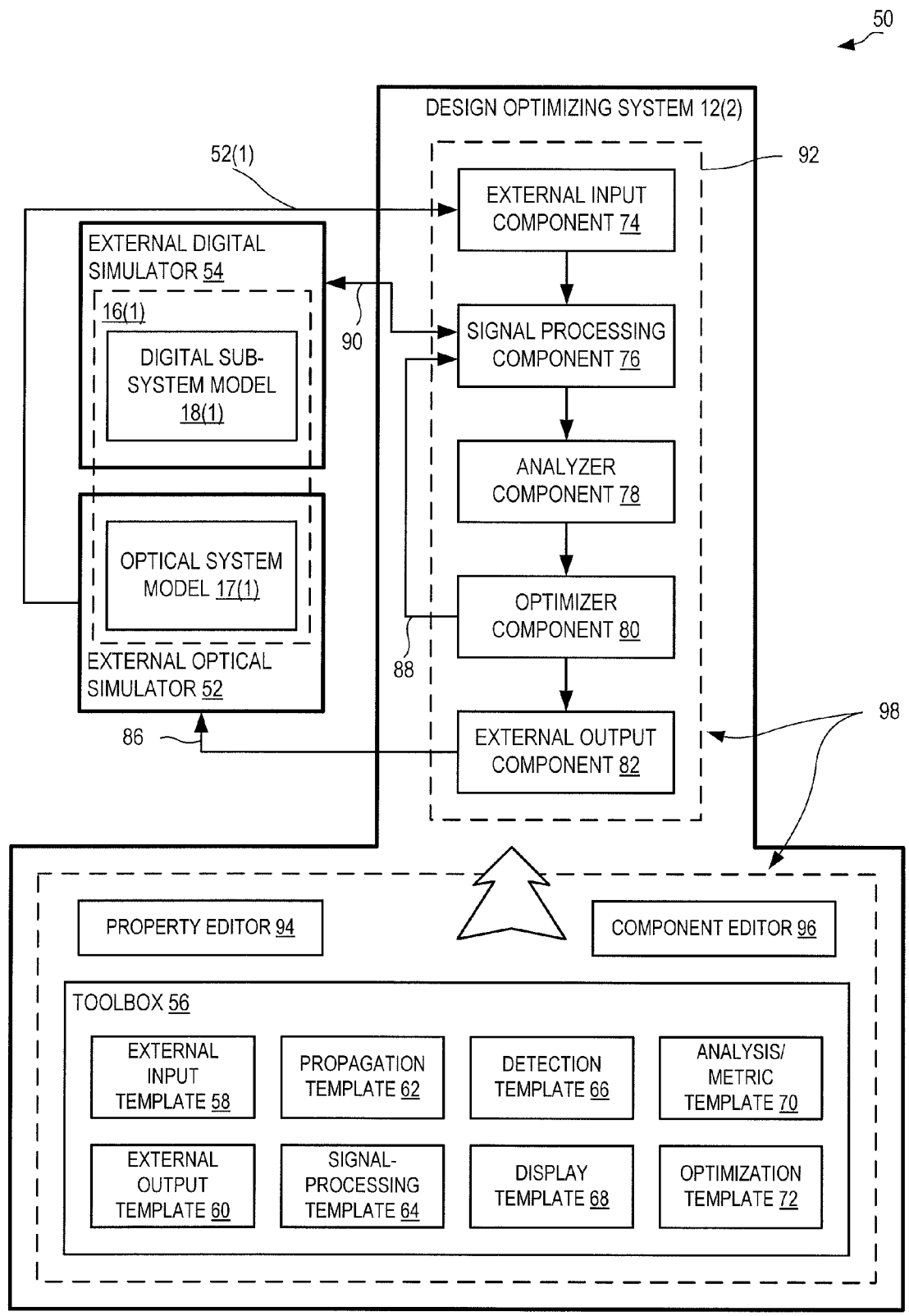
FIG. 4 shows one exemplary system embodiment that uses components to optimize an optical system design and a digital system design

FIG. 1 shows a block diagram illustrating a design optimizing system 12 for optimizing an optical system design 13, in accord with one embodiment. Optical system design 13 may be an initial optical specification that specifies a desired optical system. Optical system design 13 is input to design optimizing system 12 to create an optical system model 16. In illustrative operation, a user may create optical system model 16 interactively through a graphical user interface (e.g., as shown in FIGS. 3 and 4) of design optimizing system 12.

In one embodiment, design optimizing system 12 simulates the functioning of optical system model 16 to generate an output 16A. Output 16A is for example a pupil map generated by simulation of optical system model 16. Output 16A may however comprise additional or different information (e.g., digital image data) as described in more detail below.

An analyzer 20 processes output 16A and generates a score 20A, which may be a single number. In this processing, one or more metrics 20B within analyzer 20 are compared to output 16A to generate score 20A. In one example, a metric is an image quality metric such as point spread function (PSF); another image quality metric is for example a modulation transfer function (MTF). Metrics may include one or more of the following non-limiting examples: minimum power in the MTF derived from output 16A at a given spatial frequency band of interest; total power in a reconstructed PSF derived from output 16A outside a small enclosed and contiguous central region, for example such as a 3×3 region; power in the differences of desired PSFs known to metrics 20B and the reconstructed PSFs provided by output 16A; smoothness of optical and digital PSFs and MTFs as calculated by computing the derivative; power in the reconstruction filter as measured by computing the root sum-squared value (square-root of the sum of squared coefficients) when the sum of all coefficients equals 1.0; and any number or combination of analyses or 'Operands' provided by Zemax, for example.

An optimizer 22 processes score 20A in comparison to one or more design goals 24, which may be specified by a user of design optimizing system 12. In this process, optimizer 22 may determine that optical system model 16 is optimized, or, if not, design optimizing system 12 responds to output 22A from optimizer 22 to modify optical system model 16. If optical system model 16 is modified, simulated output of optical system model 16 is again compared against metrics 20B of analyzer 20 to generate score 20A, such that optimizer 22 may again determine if further modification is necessary. Optimizer 22 thus continues to modify optical system model 16, iteratively with analyzer 20, until design goals 24 are achieved.

Figure 6:
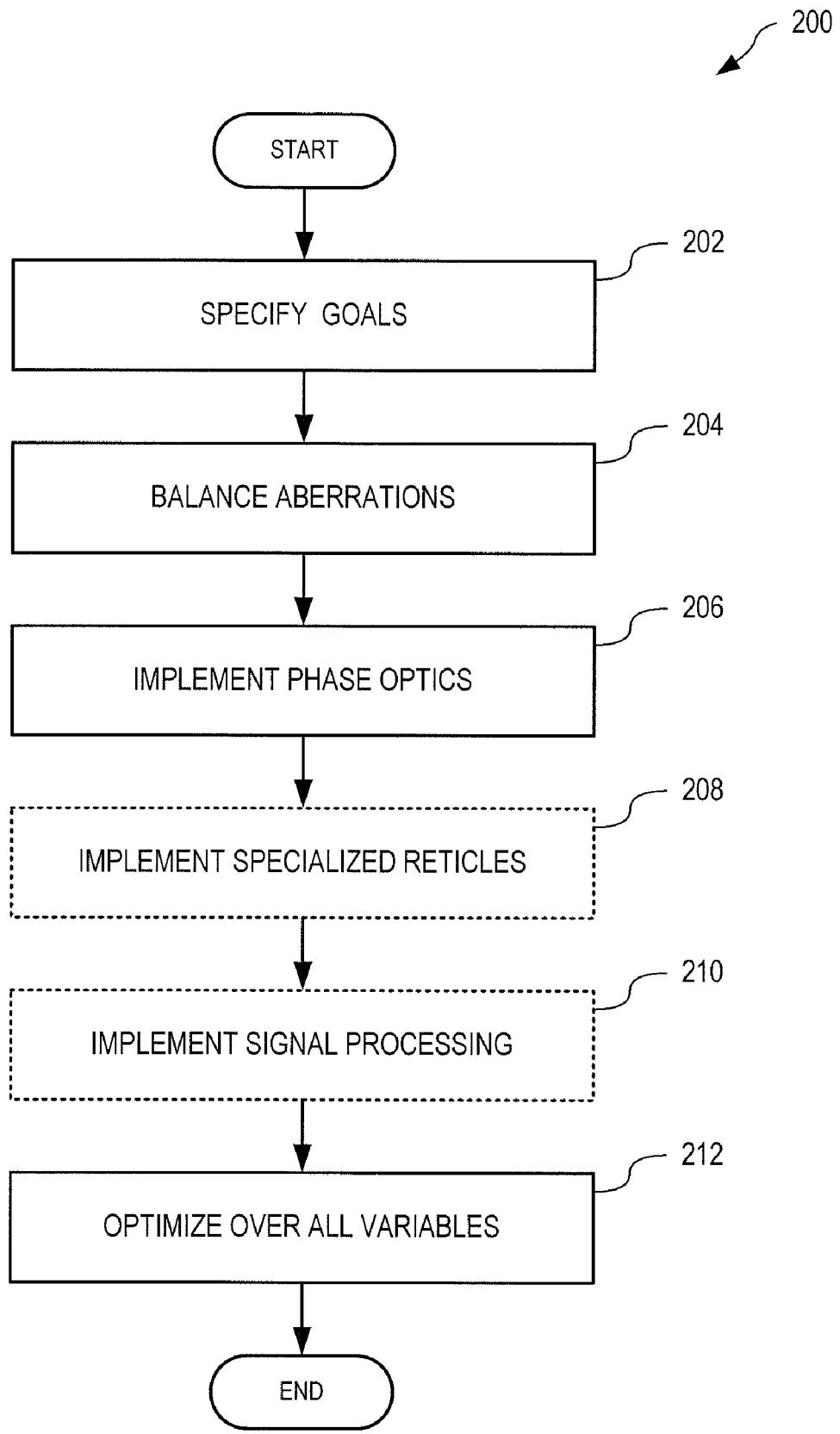
FIG. 6 is a flowchart illustrating one exemplary process embodiment for optimizing a digital system model and an optical system model with phase-modifying optics.
Figure 7:
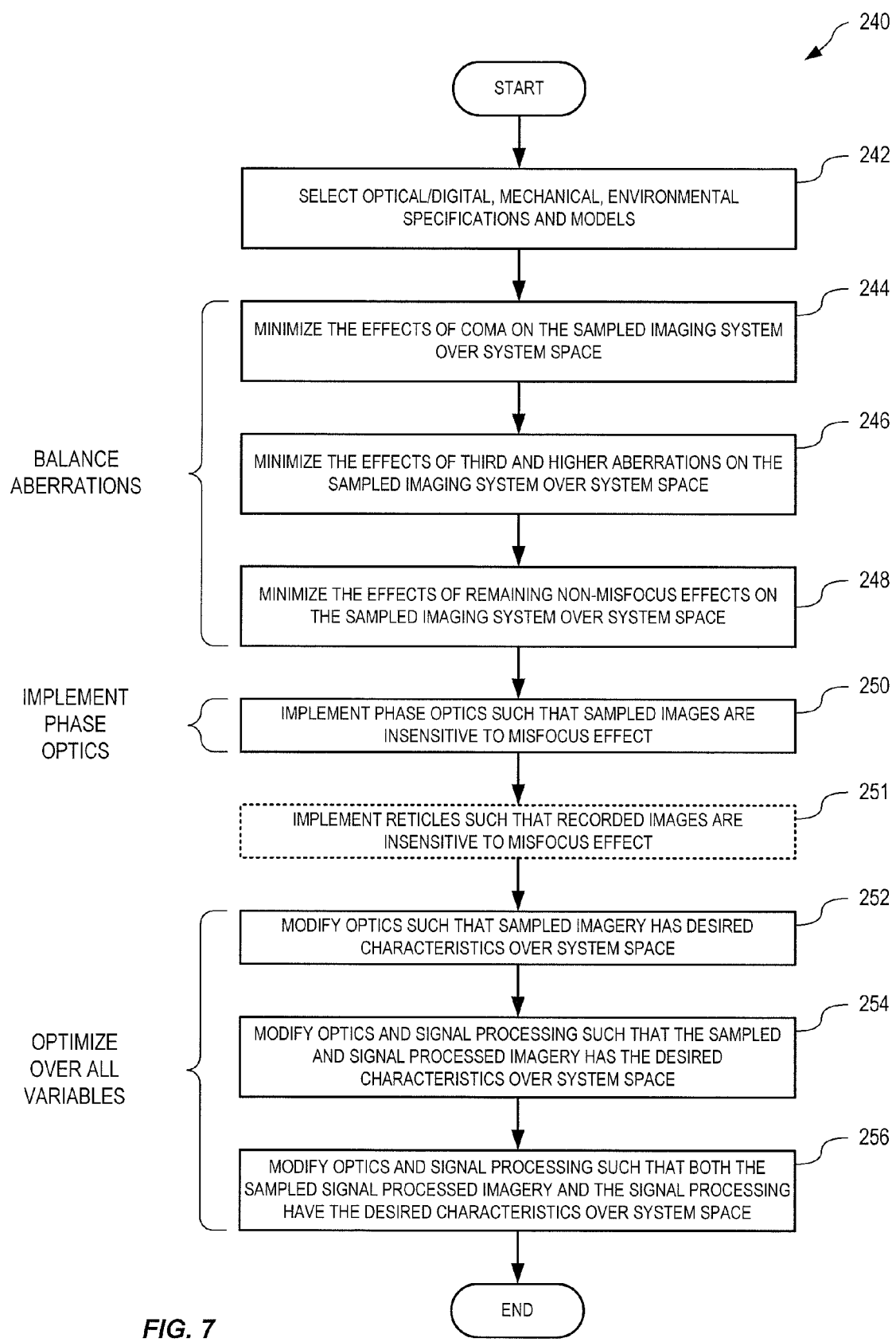
FIG. 7 is a flowchart illustrating one exemplary process embodiment for optimizing a digital system model and an optical system model with phase-modifying optics.

In one example of operation, optimizer 22 modifies optical system model 16 by incorporating one or more design objects representative of phase-modifying optics to facilitate achieving design goals 24. One optimization process implementing phase-modifying optics is illustrated in FIG. 6; another optimization process implementing phase-modifying optics is illustrated in FIG. 7.

Goals 24 may for example specify pass/fail conditions associated with score 20A. They may include, for example, a total cost of implementing design objects associated with optical design model 16.

Once design goals 24 are achieved, design optimizing system 12 may output an optimized optical system design 25 that is based on optical system model 16 as modified by optimizer 22. Optical system design 25 includes parameters that specify design objects of an optical system that meets goals 24. Design optimizing system 12 may further output a predicted performance 39 that, for example, summarizes capabilities of optimized optical system design 25.

Analyzer 20 and optimizer 22 may be components of design optimizing system 12. As used herein, a component is an executable tool that may be implemented and run within design optimizing system 12. Through a graphical user interface of design optimizing system 12, components may be designated, dragged and dropped into a user's workspace for a particular optical and/or digital design. See, e.g., FIG. 3 and FIG. 4. Components may also be described and interconnected with a scripting, macro, or programming capability. In one embodiment, each component has one or more 'pins' that connect to other components, to share data therebetween. Pins may contain expert knowledge in that incompatible pins do not share data. A component has certain properties (e.g., a text string) that may also be shared. A component may even be a pupil map that is shared as output 16A; accordingly, such a pupil map may be imported to design optimizing system 12 from an external program that separately simulates optical system model 16.

Figure 2:
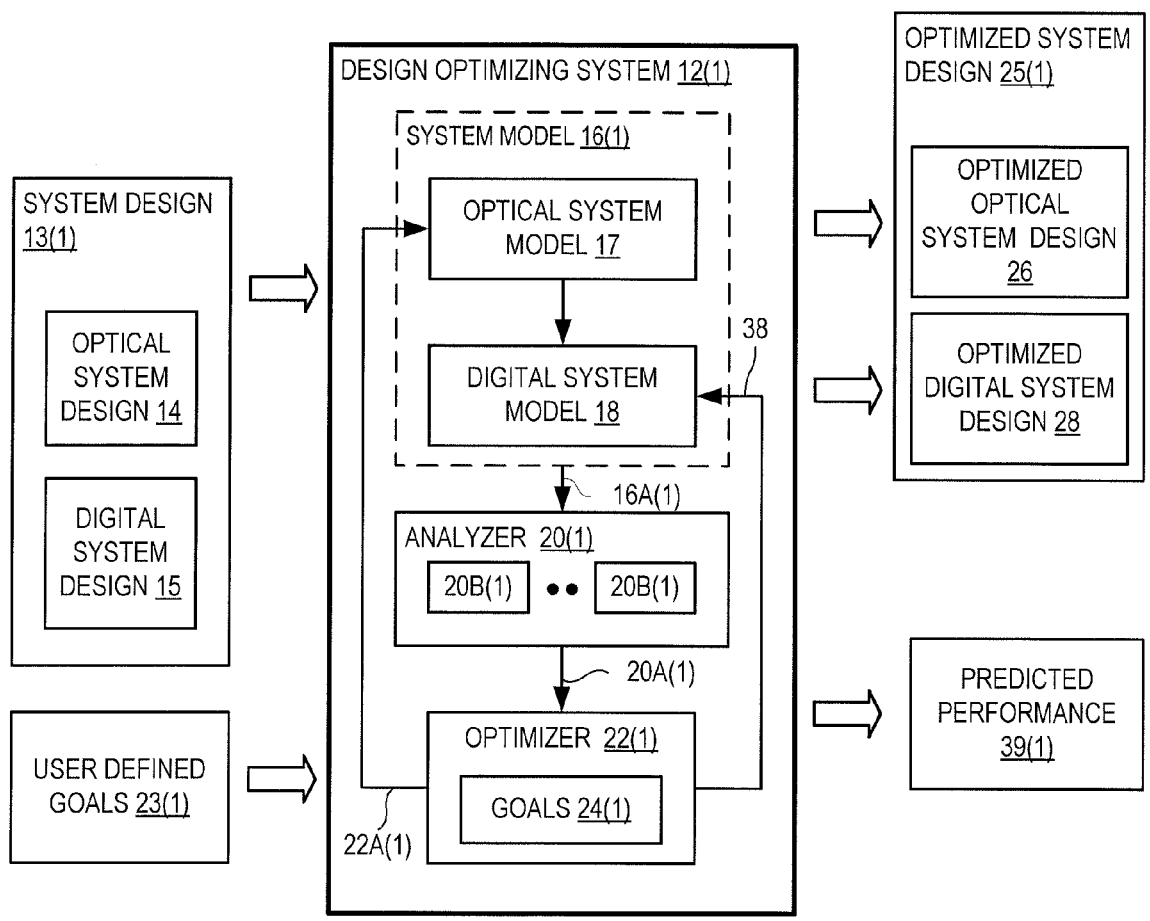
FIG. 2 shows one exemplary system embodiment for optimizing an optical system design and a digital system design.

FIG. 2 shows a block diagram illustrating a design optimizing system embodiment 12(1) for optimizing a system design 13(1), which includes both an optical system design 14 and a digital system design 15. By way of example, optical system design 14 may be an initial optical prescription for an optical system and digital system design 15 may be an initial design of signal processing that processes images from the optical system. Optical system design 14 may for example be similar to optical system design 13, FIG. 1. Design optimizing system 12(1) may function similar to design optimizing system 12, FIG. 1, except that it also generates an optimized digital system design 28, as now described.

System design 13(1) is input to design optimizing system 12(1) to create a system model 16(1). System model 16(1) illustratively includes an optical system model 17 and a digital system model 18 that represent, respectively, optical system design 14 and digital system design 15. A user may create system model 16(1), analyzer 20(1) and optimizer 22(1) interactively within a graphical user interface (as shown in FIG. 3) of design optimizing system 12(1).

In one embodiment, design optimizing system 12(1) simulates functionality of system model 16(1) to generate an output 16A(1). Output 16A(1) may for example include a pupil map generated by simulation of optical system model 17 and bit stream information associated with processing by digital system model 18. Output 16A(1) may however comprise additional or different information, such as the conditions or configurations under which the data was generated, an intensity distribution, a simulation of an object being imaged (e.g., an estimate of the image of the letter "F"), a mutual intensity function, an electromagnetic field with vector information in all ordinates, and/or digital processing information as described below.

Design optimizing system 12(1) includes an analyzer 20(1) that processes output 16A(1) to generate a score 20A(1). As above, analyzer 20(1) may utilize one or more metrics 20B(1) to determine score 20A(1). Metrics 20B(1) pertain to both optical system model 17 and digital system model 18. Results from each metric 20B(1) may be weighted and processed by analyzer 10(1) to form score 20A(1). Weights for each metric 20B(1) may, for example, be specified by a user and/or algorithmically determined.

An optimizer 22(1) processes score 20A(1) and determines the performance of system model 16(1) relative to goals 24(1), which may, again, be specified by the user (e.g., user defined goals 23(1)) for input to optimizer 22(1). If system model 16(1) is not optimized, design optimizing system 12(1) responds to output 22A(1) from optimizer 22(1) to modify optical system model 17 and/or output 38 from optimizer 22(1) to modify digital system model 18. If either of system models 17 or 18 is modified, system model 16(1) is again simulated by design optimizing system 12(1) and output 16A(1) is scored by analyzer 20(1) to generate a new score 20A(1). Optimizer 22(1) thus continues to modify system models 17 and 18 iteratively until design goals 24(1) are achieved.

Once design goals 24(1) are achieved, design optimizing system 12(1) may output an optimized system design 25(1) that is based on system model 16(1) as modified by optimizer 22(1). Optimized system design 25(1) includes an optimized optical system design 26 and an optimized digital system design 28, as shown. As described more fully below, digital system design 28 may include an electronic description, bit stream filters, simulation results, and/or other information, such as the filter kernel coefficients in many representations of binary IEEE floating-point values and integer values to a limited bit-depth and quantized values for specialized implementation in customized hardware, estimates for cost and power and gate-count and maximum speed, constraints for external input/output or communication or additional logic in hardware, constraints for allowable data values or maximum data size or bit-width, values related to fixed or variable parameters in a parameterized processing such as noise reduction or color processing, and optimized parameters or regularization factors or methods employed in the simulation which are pertinent to signal processing of optimized system design 25(1).

In one example of operation, optimizer 22(1) modifies optical system model 16(1) by incorporating one or more design objects representative of phase-modifying optics, to facilitate achieving design goals 24(1). One optimization process implementing phase-modifying optics is illustrated in FIG. 6; another optimization process implementing phase-modifying optics is illustrated in FIG. 7.

Optimized system design 25(1) may therefore include parameters that specify design objects of an electro-optical system that meets goals 24(1). Design optimizing system 12(1) may output a predicted performance 39(1) that, for example, summarizes capabilities of optimized system design 25(1).

As above, analyzer 20(1) and optimizer 22(1) may be components of design optimizing system 12(1); these components may be manipulated as run-time tools such as described now in connection with FIG. 3.

In particular, FIG. 3 illustrates operation of a workspace 48 (e.g., part of a graphical user interface (GUI) of design optimizing system 12 or 12(1)) that contains four exemplary components 40(1)-40(4). Each component has one or more input pins 42(1)-42(4) and one or more output pins 44(1)-44(6), as shown. As used herein, a "pin" is an input or output or input/output or tri-state feature of a component, and is characterized by a data type. Pins may be connected using the GUI (e.g., as shown in FIG. 4). In various embodiments, some pins may not connect with other pins, while other pins connect with one or more pins. In the example of FIG. 3, output pin 44(1) of component 40(1) connects with input pin 42(2) of component 40(2) through connection 46(1) and with input pin 42(4) of component 40(4) through connection 46(2). Since pins may contain expert knowledge, the user may be prohibited from connecting pins that cannot share data.

Components may therefore represent a wide variety of run-time tools that may be manipulated by the user. Exemplary components may include detection components, sampling components, noise modeling components, linear and non-linear signal processing components, root-mean-square analysis components, human observer-based components, analysis components (e.g., analyzers 20, 20(1)), optimizing components (e.g., optimizers 22, 22(1)), graphical display components, propagation model components for optical design objects (e.g., optical model 16, 17), user-defined components, "packaging" components that export formatted information (for example to prepare and export a CNC script for a computer numeric controlled tool, or automatically generate fabrication description documents for a lens maker), and interface components that support dynamic and iterative input from, and output to external designs and/or software systems (e.g., optical design packages such as Zemax and computational packages such as MATLAB).

FIG. 4 shows a schematic diagram 50 illustrating functionality of components in a design optimizing system 12(2), in accord with one embodiment. Design optimizing system 12(2) connects to and operates with an external optical simulator 52 and/or an external digital simulator 54. Design optimizing system 12(2) may connect to and communicate with simulators 52 and/or 54 over a network, for example.

In operation, design optimizing system 12(2) optimizes optical system designs and/or digital system designs. Design optimizing system 12(2) has a GUI 98 that facilitates utilization (e.g., by drag-and-drop actions) of template components from a toolbox 56 within a workspace 92 to create a model (e.g., system model 16(1), FIG. 2) of the optical and/or digital designs.

Toolbox 56 is illustratively shown with eight exemplary component templates 58, 60, 62, 64, 66, 68, 70 and 72 that may be interactively dragged, using a mouse for example, and dropped into workspace 92. External input template 58 is a template for an external input component that allows design optimizing system 12(2) to receive input from an external package (e.g., from external optical simulator 52). External output template 60 is a template for an external output component that allows design optimizing system 12(2) to send output to an external package (e.g., to external optical simulator 52). Propagation template 62 is a component template for a propagation component that models signal propagation within an optical model (e.g., optical system model 17, FIG. 2). Signal processing template 64 is a template for a signal processing component that models signal processing of a digital system model (e.g., digital system model 18, FIG. 2). Detection template 66 is a template for a detection component that models a detector such as a focal plane array ("FPA"). Detection template 66 also allows input from an external detection device (e.g., a charge coupled device ("CCD") such as a camera) to be selected for use by design optimization system 12(2). Display template 68 is a template for a display component that allows imagery and other information to be displayed within GUI 98, for example. Analysis/metric template 70 is a template for an analyzer component (e.g., analyzer 20 or 20(1)) that scores output (e.g., output 16A, 16A(1)) of simulations of a system model (e.g., system model 16(1), FIG. 2). Optimization template 72 is a template for an optimization component (e.g., optimizer 22 or 22(1)) that evaluates a score (e.g., output 20A, 20A(1)) from one or more analysis/metric components against goals (e.g., goals 24 or 24(1)) to determine whether the goals have been achieved. Output from an optimization component may be used by a design optimizing system (e.g., system 12(1), FIG. 2) to modify the system model, iteratively, to achieve the goals.

Templates from toolbox 56 may thus be combined within workspace 92 to optimize a system model (e.g., system model 16(1), FIG. 2). New template components may be created and added to toolbox 56, for example using a component editor 96 or a programming language such as C/C++ or MATLAB or macro languages defined by external applications.

Continuing with the example of FIG. 4, external input template 58 is dragged from toolbox 56 and dropped into workspace 92 and is shown as external input component 74. Similarly, signal processing template 64 is dragged from toolbox 56 and dropped into workspace 92 and is shown as signal processing component 76; analysis/metric template 70 is dragged from toolbox 56 and dropped into workspace 92 and is shown as analyzer component 78; optimization template 72 is dragged from toolbox 56 and dropped into workspace 92 and is shown as optimizer component 80; and external output template 60 is dragged from toolbox 56 and dropped into workspace 92 and is shown as external output component 82. Once placed into workspace 92, these components may be connected to transfer data between components. Such connections may be implemented graphically, e.g., by using a mouse as illustrated in FIG. 3, by selecting the component and configuring its properties using a property editor 94 and/or by an associated script, macro and/or programming language.

In the example of FIG. 4, external input component 74 is configured (e.g., using property editor 94), to receive input from external optical simulator 52. External optical simulator 52 is, for example, a commercially-available optical design package (e.g., Zemax, Code V). External optical simulator 52 is shown simulating optical system model 17(1), to generate output 52(1) that is input to external input component 74. Output 52(1) from external optical simulator 52 may for example comprise a pupil map and/or other information relating to simulation of optical system model 17(1) by external optical simulator 52. External input component 74 may, for example, utilize remote procedure calls to operate external optical simulator 52. In one embodiment, execution of design optimizing system 12(2) may be initiated by external optical simulator 52.

Output 52(1) may also be communicated from external input component 74 to signal processing component 76 and/or analyzer component 78. In this example, signal processing component 76 is configured to utilize external digital simulator 54 for simulating digital system model 18(1). Data between signal processing component 76 and external digital simulator 54 may be communicated over signal line 90, as shown. Signal line 90 may, for example, be shared memory within a single processor, or may utilize network standards to communicate across platforms.

In one example, external digital simulator comprises MATLAB, which is programmed to simulate digital system model 18(1), receive input from signal processing component 76 communicated over signal line 90, and generate output communicated over signal line 90 to signal processing component 76. This output may for example include bit stream information processed by external digital simulator 54.

Analyzer component 78 may be configured (e.g., using property editor 94) to score output from signal processing component 76. This score is used by optimizer component 80 to determine whether and how to modify optical system model 17(1) and/or digital system model 18(1). Instructions to modify optical system model 17(1) are passed from optimizer component 80 through external output component 82 and via communication path 86 to external optical simulator 52; instructions to modify digital system model 18(1) are passed from optimizer component 80 to signal processing component 76 via communication path 88. Accordingly, optimizer component 80 may modify properties of signal processing component 76, directly through communication path 88 which may comprise any of the previously stated communication methods; and signal processing component 76 may modify parameters of digital system model 18 directly through communication path 90. Similarly, based on output from optimizer component 80, external output component 82 may modify parameters of optical system model 17(1) via communication path 86. External output component 82 may, for example, utilize remote procedure calls to interface with external optical simulator 52.

Once constructed in a manner shown in FIG. 4, design optimizing system 12(2) may function like system 12(1) of FIG. 2, to optimize an optical and digital design to meet goals 24(1) based on user-specified goals 23(1).

Design optimizing system 12(2) may include fewer or more templates and components, and may interface to zero, one or more external simulators to simulate and optimize system models. Properties of any one component may also be specified as variable for optimization, if desired. Properties may also be specified as fixed, pick-up and algorithmic. A value associated with a fixed property may not be modified during optimization. A pick-up property may have a value that is based upon a property value of another component. For example, the pick-up property value may be specified as twice that of another property value. An algorithmic property has a value that is defined by an algorithm. For example, the algorithmic property value may be specified as being twice the value of a first property plus three times the value of a second property.

Figure 5:
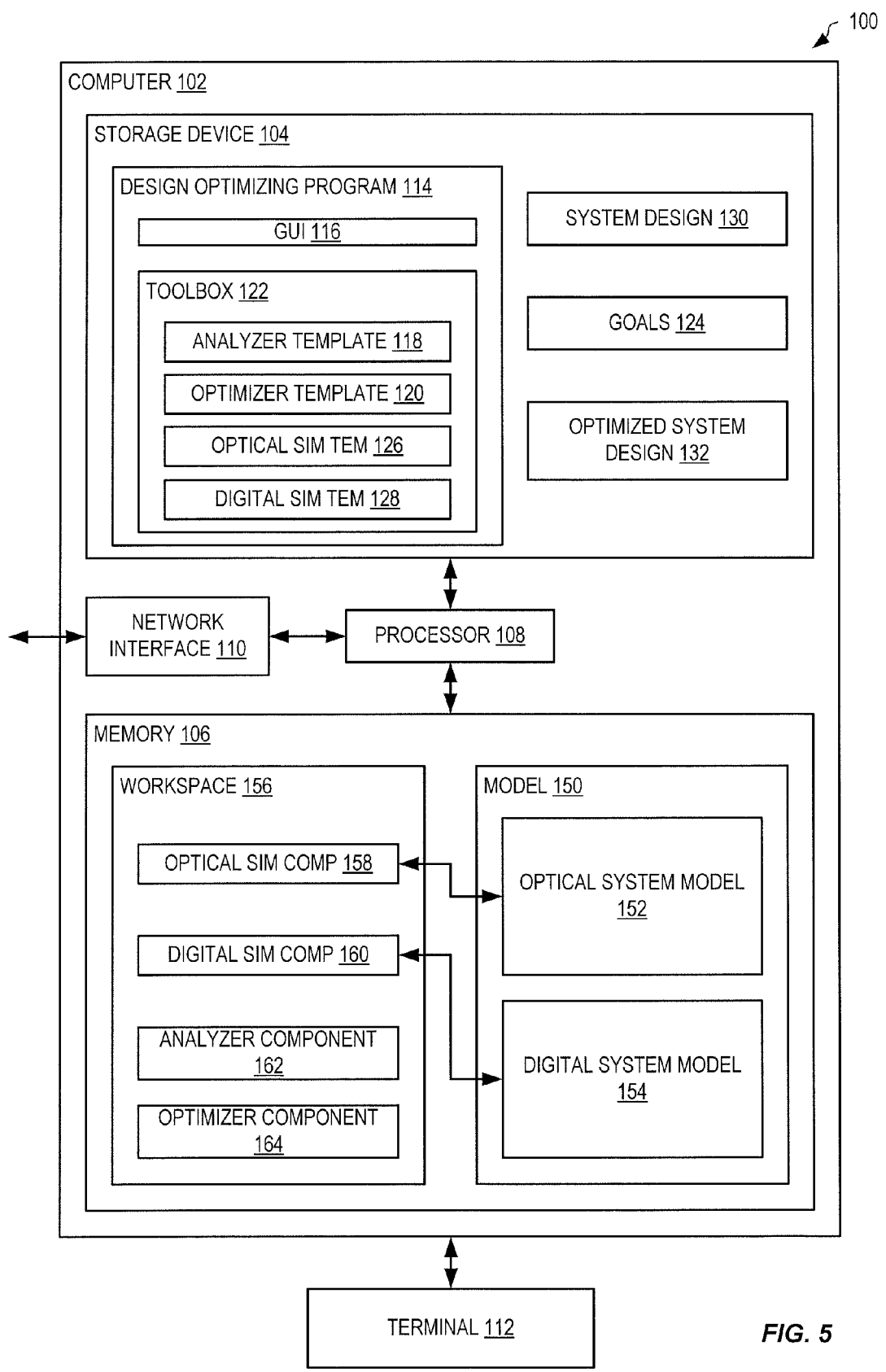
FIG. 5 shows one exemplary system embodiment for optimizing an optical system design that has phase-modifying optics.

FIG. 5 shows one exemplary system 100 for optimizing a system design (e.g., system design 13(1), FIG. 2). System 100 is shown with a computer 102 and a terminal 112. Computer 102 has a storage device 104, memory 106 and a processor 108. Storage device 104 is, for example, a hard disk drive or other non-volatile storage media. Storage device 104 is shown with a design optimizing program 114, a system design 130, goals 124 and an optimized system design 132. Design optimizing program 114 may for example simulate functionality of design optimizing system 12(1) of FIG. 2 or system 12(2) of FIG. 4. Design optimizing program 114 is illustratively shown with a GUI 116 and a toolbox 122. GUI 116 and toolbox 122 may, for example, represent GUI 98 and toolbox 56, respectively, of FIG. 4. Toolbox 122 is shown with an analyzer template 118, an optimizer template 120, an optical simulator template 126 and a digital simulator template 128. Optical simulator template 126 represents a template for a component that simulates an optical system model. Digital simulator template 128 represents a template for a component that simulates a digital system model. For example, optical simulator template 128 and digital simulator template 128 may provide the functionality of external optical simulator 52 and external digital simulator 54, respectively. System design 130 may include an optical system design (e.g., optical system design 14, FIG. 2) or both an optical system design and a digital system design (e.g., digital system design 15, FIG. 2). Goals 124 may represent goals 24(1) of FIG. 2 and/or goals 24 of FIG. 1. In one example of operation, a user of system 100 utilizes terminal 112 to create goals 124 that specify desirable features (e.g., cost of manufacture) of system design 130.

Processor 108 may load part or all of design optimizing program 114 into memory 106 for execution therein.

In an example of operation, a user interacts with design optimizing program 114 to create a workspace 156 within memory 106. Workspace 156 may, for example, represent workspace 92, FIG. 4. As described above, the user may drag and drop templates of toolbox 122 into workspace 156. Workspace 156 is shown with optical simulator component 158, digital simulator component 160, analyzer component 162 and optimizer component 164. Workspace 156 may contain more or fewer component as desired.

In the example of FIG. 5, optical simulator component 158 simulates an optical system model 152 within a system model 150. Digital simulator component 160 simulates a digital system model 154 within model 150. Optical system model 152 and digital system model 154 represent optical and digital parts of system design 130, for example.

Terminal 112 may, for example, be a graphical computer interface device suitable for displaying graphical information. In one embodiment, computer 102 is a personal computer system, and terminal 112 represents a monitor terminal, a keyboard and a mouse.

Computer 102 is also shown with a network interface 110. Network interface 110 is optional, and may be included within computer 102 to allow design optimizing program 114 to communicate with and/or control other computer systems. Design optimizing program 114 may therefore utilize distributed processing (see FIG. 9), via network interface 110, during optimization of model 150; such processing may for example employ external simulators (e.g., simulators 52, 54, FIG. 4).

Figure 13:
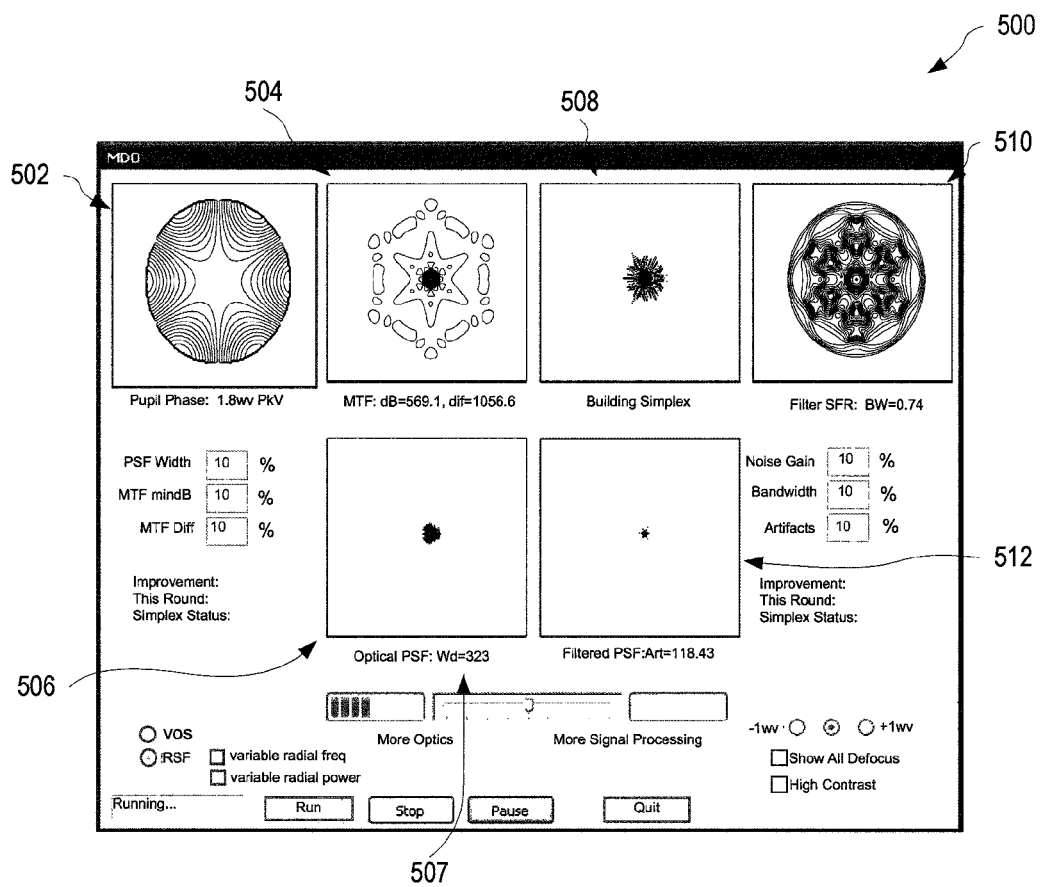
FIG. 13 shows a computer screen display illustrating operation of one design optimizing system in one embodiment.

FIG. 13 shows a computer screen display 500 illustrating operation of design optimizing system 12(1), FIG. 2, and analysis of a system model (e.g., system model 17), in accord with one embodiment. In the example of FIG. 13, computer screen display 500 graphically illustrates a pupil map 502 that represents an output from an optical system model (e.g., optical system model 17, FIG. 2). By way of example, pupil map 502 may be input to design optimizing system 12 from external optical simulator 52, as shown in FIG. 4; external optical simulator 52 then simulates optical system model 17(1) to produce output 52(1), which is input to external input component 74 as pupil map 502. In another example, a user may not have access to the design of an optical system, but may have pupil map 502 formed from the design. In this case, pupil map 502 may be provided as a matrix of numbers within a data file for input to design optimizing system 12(1) or as a set of polynomial coefficients, for example Zernike coefficients. In still another example, pupil map 502 may be generated from one or more equations describing an amplitude and phase function and input to design optimizer system 12(1).

An optical MTF 504 is shown in display 500. Optical MTF 504 is produced by correlation of pupil map 502 with the complex conjugate of pupil map 502. Optical MTF 504 may be analyzed (e.g., by analyzer 20(1), FIG. 2 or analyzer component 78, FIG. 4) to determine the difference and minimum power of optical MTF 504. Analyzer 20(1) may, for example, compare the difference and minimum power of optical MTF 504 to metrics 20B(1) to determine output 20A(1).

In commercial applications like Zemax or CodeV, Analyzer 20, 20(1) may be called a Merit Function and may contain metrics also known as "Operands". Prior art operands do not however include signal processing metrics 20B, 20B(1) required by analyzer 20, 20(1) when optimizing an electro-optical system.

An optical PSF 506 is formed from optical MTF 504 using inverse Fourier transform. Optical PSF 506 is analyzed, by analyzer 20(1) for example, to produce a PSF width 507. PSF width 507 may be compared to metrics 20B(1) by analyzer 20(1) when determining output 20A(1). In this example, metrics 20B(1) determine the minimum and maximum spatial locations of optical PSF 506 in the horizontal direction in which the power in optical PSF 506 is above a certain threshold. The distance between these determined spatial locations multiplied by a scale factor (e.g., 10 in the example in FIG. 13) is PSF width 507 for the horizontal direction.

Output from optical system model 17 is 'sampled' to model digital data for input to digital system model 18. In one example, detection template 68 may be utilized to model sampling operations of a CCD array or particles in an emulsion such as a photoresist. Optical PSF 506 may therefore be 'sampled' to produce a digital PSF for input to digital system model 18. To simplify calculation in the example of FIGS. 13 and 14, an ideal detector is assumed and optical PSF 506 may be input directly into digital system model 18 (e.g., input into signal processing component 76, FIG. 4).

Signal processing component 76 may, for example, implement a filter. Where optical system design 14 includes phase-modifying optics, for example, signal processing component 74 implements a filter that decodes (e.g., by a least squares calculation or by a parametric Wiener design) effects of the phase-modifying optics. The optical PSF 506 (or digital PSF if sampling is employed) is used in the least-squares calculation to produce a 2D filter 508.

Figure 15:
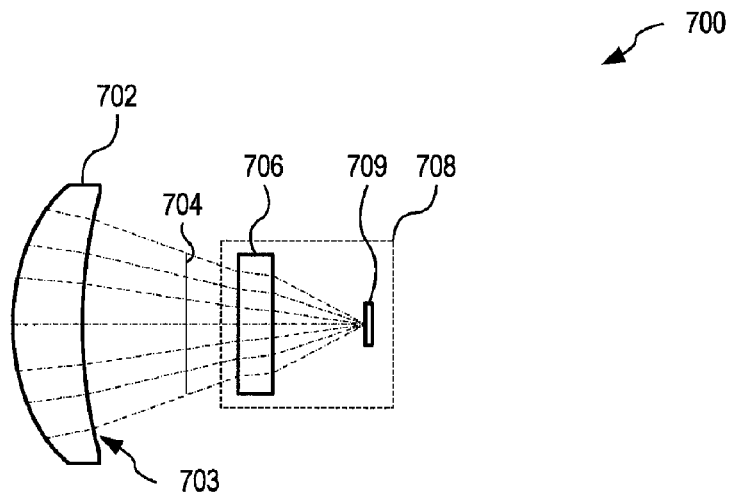
FIG. 15 shows one exemplary optical system design for an infrared seeker.

Filter spatial frequency response 510 is determined by performing a fast Fourier transform ("FFT") on 2D filter 508. For example, analyzer 20(1) may perform the FFT. In the example of FIG. 15, bandwidth is shown as 0.74. Bandwidth of 2D filter 508 may then be determined from filter spatial frequency response 510 by analyzer 20(1), for example, and may be compared to metrics 20B(1) to determine output 20A(1).

Analyzer 20(1) may also determine filter power (for example by root-sum-squared calculation) and other characteristics from filter spatial frequency response 510 if required for use in output 20A(1).

A filtered PSF 512 is created from 2D filter 508 and optical PSF 506 using a linear convolution, for example. Filtered PSF 512 is then analyzed by analyzer 20(1) to determine artifacts, size, similarity through defocus and other characteristics that may be utilized in determining output 20A(1). Further, these characteristics may each be weighted as to their influence upon output 20A(1).

Optimizer 22(1) receives output 20A(1) from analyzer 20(1). As described above, output 20A(1) includes a score that is based upon a weighted aggregate of analysis results determined from optical MTF 504, optical PSF 507, filter 508, filtered PSF 512 and filter spatial frequency response 510. Since optimizer 22(1) knows which properties of optical system model 17 are variable, it may, therefore, modify these properties to change pupil map 502. Similarly, optimizer 22(1) knows which properties of digital system model 18 are variable, and may, therefore, modify these properties to change filtered PSF 512 by way of modification to filter 508. Accordingly, optimizer 22(1) may modify properties of one or both optical system model 17 and digital system model 18 based upon output 20A(1) to achieve goals 24(1).

Design optimizing system 12(1) iteratively optimizes system model 16(1) by repeatedly simulating and analyzing system model 16(1). For example, if properties of either optical system model 17 and digital system model 18 are modified, optical system model 17 and digital system model 18 are simulated and analyzer 20(1) again analyzes output from both optical system model 17 and digital system model 18 to produce output 20A(1). Further, optimizer 22(1) also remembers changes made to system model 16(1) and analysis results of that system configuration when determining further modifications to system model 16(1).

Figure 14:
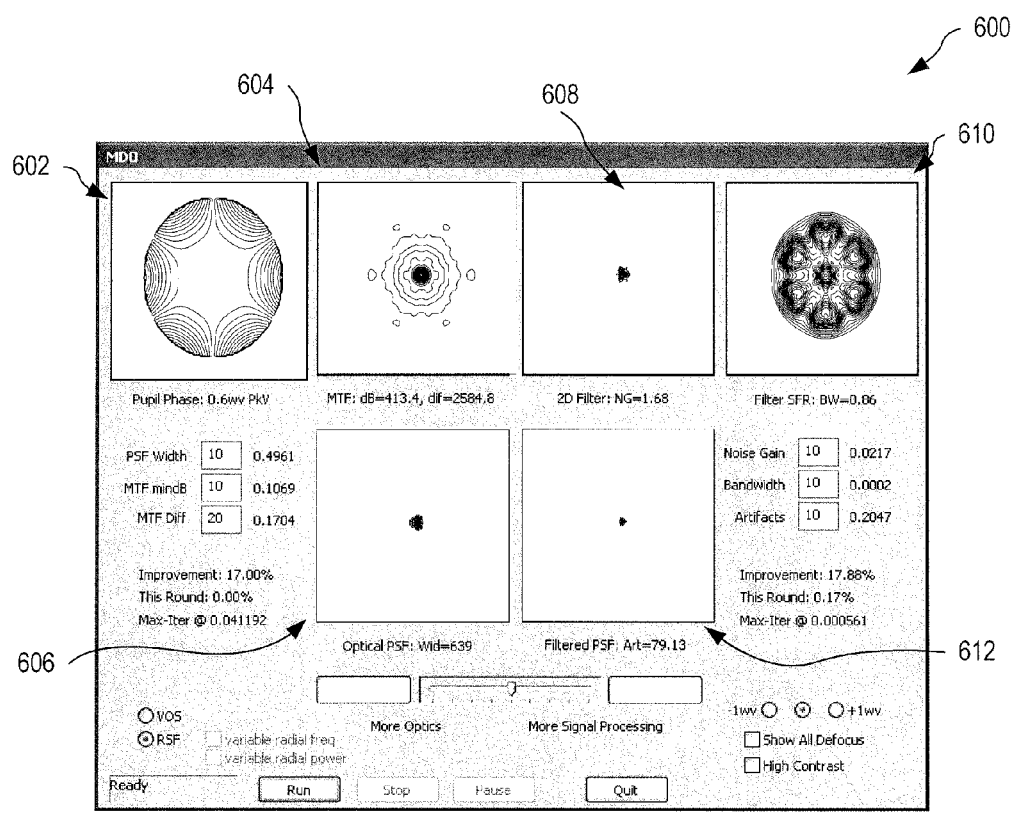
FIG. 14 shows a computer screen display after operation of the design optimizing system of FIG. 13

FIG. 14 shows a computer screen display 600 illustrating a pupil map 602, an optical MTF 604, an optical PSF 606, a 2D filter 608, a filter spatial frequency response 620 and a filtered PSF 612 after optimization. Optical system model 17 and digital system model 18 were both modified by optimizer 22(1) to achieve goals 24(1).

In the foregoing system descriptions, an optical system design is often optimized by determining and specifying objects as phase-modifying optics. When implemented within an optical system, these phase-modifying optics beneficially reduce, for example, effects of misfocus and/or misfocus like aberrations.

FIG. 6 shows a flowchart illustrating one exemplary process embodiment 200 for optimizing an optical system model with phase-modifying optics. Steps 204-212 of process 200 are, for example, implemented by optimizer component 164 of workspace 156, FIG. 5.

In step 202, process 200 determines goals of system model 150. In one example of step 202, the user of system 100, FIG. 5, interacts with GUI 116 of design optimizing program 114, through terminal 112, to create goals 124; these goals are then read by optimizer component 164 in step 202.

In step 204, process 200 balances aberrations of an optical system model. In one example of step 204, optimizer component 164 modifies properties of optical system model 152 to minimize effects of coma, balance and minimize aberration effects other than coma, and balance stray light, ghost images, shadows, reflections and vignetting.

In step 206, process 200 implements phase-modifying optics. In one example of step 206, optimizer component 164 implements an aspheric curvature on a surface of one optical design object of optical system model 152.

Step 208 is optional and included when an optical system model 17(1) is designed for imaging a reticle to photoresist within a lithographic imaging apparatus. In step 208, process 200 implements specialized reticles. In one example of step 208, optimizer component 164 modifies properties of a reticle of optical system model 152. Commonly-owned and copending U.S. application Ser. No. 10/858,337, entitled Lithographic Systems and Methods With Extended Depth of Focus, is incorporated herein by reference.

Step 210 is optional. In step 210, process 200 implements signal processing functionality within a digital system model (e.g., digital system model 18(1)). In one example of step 210, optimizer component 164 modifies signal processing functionality of digital system model 154 to decode effects of phase-modifying optics added to optical system model 152.

In step 212, process 200 optimizes variable properties in model 150. In one example of step 212, optimizer component 164 modifies (a) properties of optical system model 152 to control, for example, apertures, thicknesses, spherical, conical, and aspheric terms, (b) properties of both optical system model 152 and digital system model 154, to achieve goals 124, and (c) properties of model 150 to control, for example, platform, architecture of execution, power consumption, size, cost, or speed of digital system model 154.

Steps 204 though 212 may repeat until goals 124 are achieved.

FIG. 7 is a flowchart illustrating one exemplary process embodiment for optimizing a digital system model and an optical system model with phase-modifying optics. Step 242 of process 240 may be implemented by design optimizing program 114 of FIG. 5, for example, and steps 244-256 are implemented within optimizer component 164 of design optimizing program 114, for example.

In step 242, process 240 determines goals for the optical system. In one example of step 242, a user may interact with design optimizing program 114 to create goals 124. In particular, the user may use terminal 112 to interact with GUI 116 of design optimizing program 114 to create goals 124. Goals 124 may, for example, include a temperature range of operation, a maximum power consumption by microprocessors, speed of processing (pixels or images per unit of time), optical distortion and color correctness and/or minimum MTF power for a given spatial frequency.

In step 244, process 240 balances first-order aberration effects by modifying aperture or stop locations, spherical and conical surface descriptions, and thicknesses of optical objects of the optical system. In one example of step 244, optimizer component 164 modifies properties of optical system model 152 to minimize the effects of coma.

In step 246, process 240 balances other aberration effects by modifying aperture or stop locations, spherical and conical surface descriptions, and/or thicknesses of optical objects of the optical system. In one example of step 246, optimizer component 164 modifies properties of optical design model 152 to balance and minimize aberration effects other than coma.

In step 248, process 240 balances non-aberration effects. In one example of step 248, optimizer component 164 modifies properties of optical system model 152 to balance or control stray light, ghost images, shadows, reflections and/or vignetting.

In step 250, process 240 implements phase optics to make sampled images insensitive to misfocus. In one example of step 250, optimizer component 164 modifies properties of optical system model 152 to control higher order aspheric terms in the surface description of an optical design object such that the sampled images are insensitive to misfocus (over a range) and are in balance with modifications of steps 244-248.

Step 251 is optional. Step 251 is for example implemented during design of an optical system for lithography. In step 251, process 240 implements reticles such that recorded images are insensitive to misfocus effect. In one example of step 251, optimizer component 164 modifies properties of optical system design 152 to implement reticles. As appreciated, where a reticle is included, its parameters may also be modified and balanced with other modifications to achieve goals 124.

In step 252, process 240 modifies apertures, thicknesses, spherical, conical, and/or aspheric terms of the optical system model such that the image-related goals from step 242 are reached. In one example of step 252, optimizer component 164 modifies properties of optical system model 152 to control apertures, thicknesses, spherical, conical, and/or aspheric terms.

In step 254, process 240 modifies properties of optical system model 152 and properties of digital system model 154 to achieve the image-related goals of step 242. In one example of step 254, optimizer component 164 modifies properties of both optical system model 152 and digital system model 154 to achieve goals 124.

In step 256, process 240 modifies properties of optical system model 152 and properties of digital system model 154 to achieve the goals of digital system model 154. In one example of step 256, optimizer component 164 modifies properties of optical system model 152 and properties of digital system model 154 to achieve goals 124, including platform, architecture of execution, power consumption, size, cost, and/or speed of digital sub-system model 154.

Figure 8:
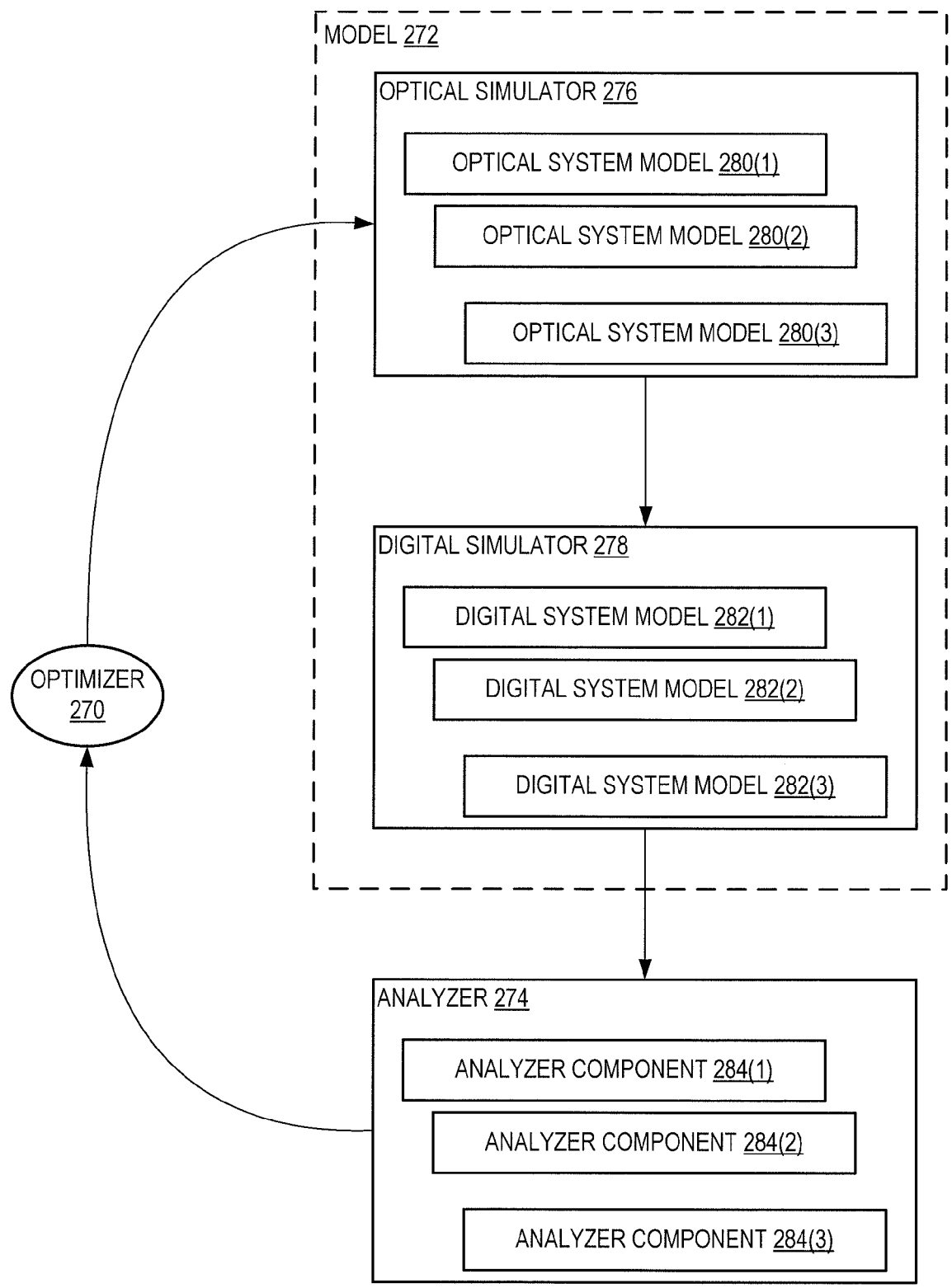
FIG. 8 is a schematic diagram illustrating parallel optimization of optical and digital system designs, in accord with one embodiment.

FIG. 8 is a schematic diagram illustrating parallel optimization of optical and digital system designs, in accord with one embodiment. A model 272 is shown with an optical simulator 276 and a digital simulator 278. Model 272 may, for example, represent optical system model 16(1) of FIG. 2. In one example, optical simulator 276 and digital simulator 278 may represent optical simulator 158 and digital simulator 160 of workspace 156, FIG. 5. In another example, optical simulator 276 may represent external optical simulator 52, FIG. 4 and digital simulator 278 may represent external digital simulator 54.

In this example, optical simulator 276 is shown simulating three optical system models 280(1), 280(2) and 280(3). Each of optical system models 280 may, for example, represent one optical system model 17 of FIG. 2. In an alternate embodiment, optical system models 280 may each be simulated by independent optical simulators, which may or may not be running on the same computer system.

Similarly, digital simulator 278 is shown with three digital system models 282(1), 282(2) and 282(3). Each of digital system models 282 may, for example, represent one digital system model 18 of FIG. 2. In an alternate embodiment, digital system models 282 may each be simulated by independent digital simulators, which may or may not be running on the same computer system.

FIG. 8 also shows analyzer 274, including three analyzer components 284(1), 284(2) and 284(3), and an optimizer 270 (e.g., optimizer 22(1) of FIG. 2). Each analyzer component 284 may represent analyzer component 78, FIG. 4.

Output from optical system model 280(1) is input to digital system model 282(1). An output from digital system model 282(1) is input to analyzer component 284(1) that scores one or more characteristics of this input. Similarly, outputs from optical system models 280(2) and 280(3) are input to digital system models 282(2) and 282(3), respectively. Output from digital system models 282(2) and 282(3) are input to analyzer components 284(2) and 284(3), respectively.

Optimizer 270 processes outputs from analyzer components 284(1), 284(2) and 284(3) and produces modifications, if necessary, to properties of optical system models 280 and digital system models 282 to achieve goals (e.g., goals 24) of the optical system design.

Figure 9:
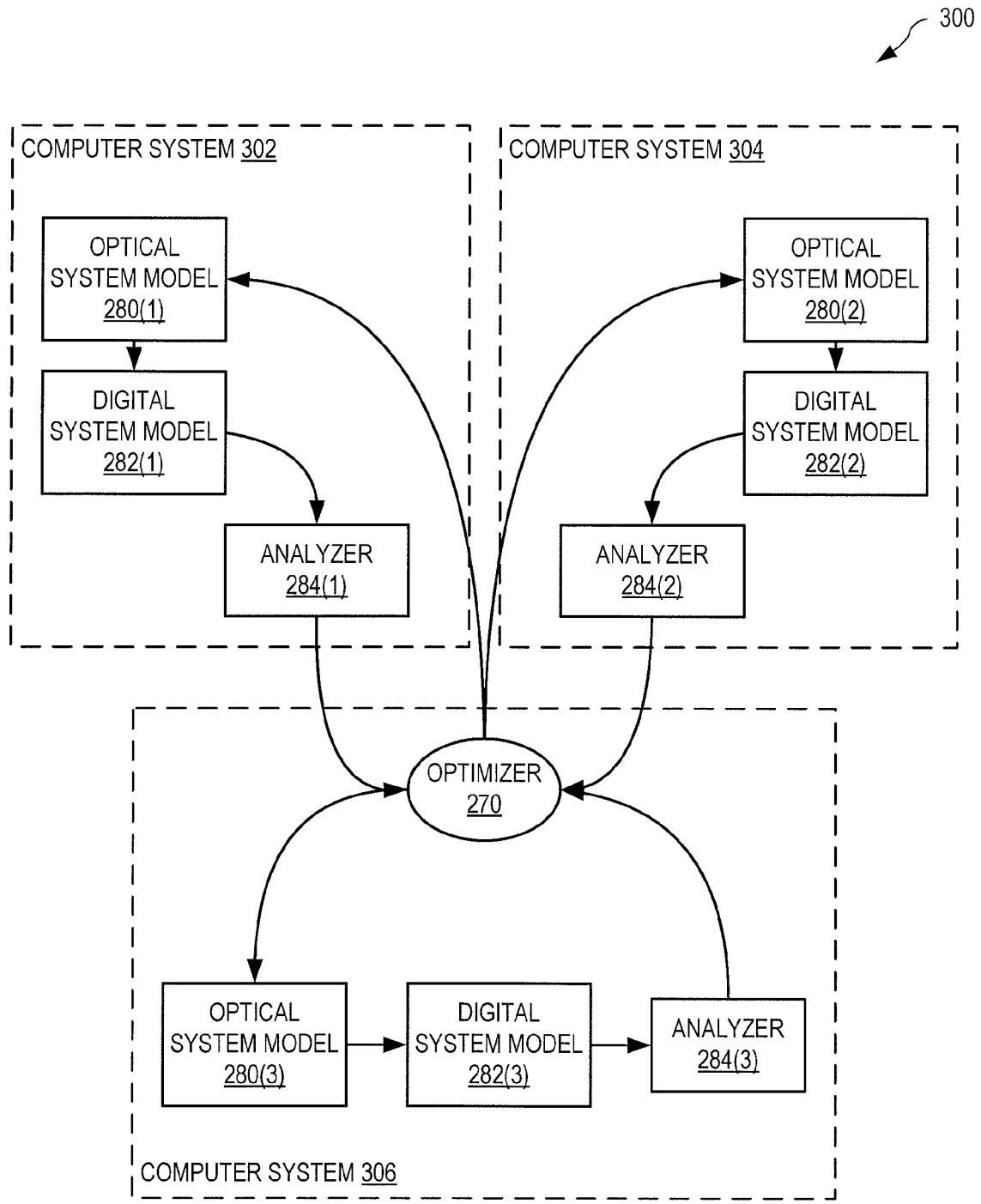
FIG. 9 is a schematic diagram illustrating distributed optimization of optical and digital system designs, in accord with one embodiment.

To illustrate distributed processing capabilities of design optimizing program 114, FIG. 5 (or design optimizing system 12, FIG. 1, for example), FIG. 9 shows a schematic diagram 300 illustrating three exemplary computer systems 302, 304 and 206. Computer systems 302, 304 and 306 are connected together by a network (not shown) such as an Ethernet network. In this example, computer system 306 includes an optimizer 270 that may, for example, represent optimizer component 80, FIG. 4.

Computer system 302 is illustratively shown with optical system model 280(1), digital system model 282(1) and analyzer 284(1). Optical system model 280(1) connects to digital system model 282(1), which in turn connects to analyzer 284(1). Computer system 304 is illustratively shown with optical system model 280(2), digital system model 282(2) and analyzer 284(2). Optical system model 280(2) connects to digital system model 282(2), which in turn connects to analyzer 284(2). Computer system 306 is also illustratively shown with optical system model 280(3), digital system model 282(3) and analyzer 284(3). Optical system model 280(3) connects to digital system model 282(3), which in turn connects to analyzer 284(3). Analyzers 284 process inputs from digital system models 282 and score the input information. Analyzers 284 each connect to, and send scored information to, optimizer 270.

Optimizer 270 processes these scores to determine if and how properties of optical system models 280 and digital system models 282 should be modified such that goals (e.g., goals 124) of the system design are achieved.

Schematic diagram 300 shows three optical systems being concurrently modeled and optimized across three computer systems. As appreciated more or fewer computer systems, optical system models 280, digital system models 282, analyzers 284 and optimizers 270 may be included without departing from the scope hereof.

In the example of FIG. 9, optimizer 270 also manages task distribution and communication between computer systems 302, 304 and 306. In an alternate embodiment, one or more of computer systems 302, 304 and 306 may include a supervisor or arbitrator process to manage task distribution and communications. In yet another embodiment, one or more of computer systems 302, 304 and 306 may have an optimizer that is not controlled by or connected to other computer systems. However, analyzers 284 may still communicate a score to optimizer 270 for overall control of optimization within system 300.

Figure 10:
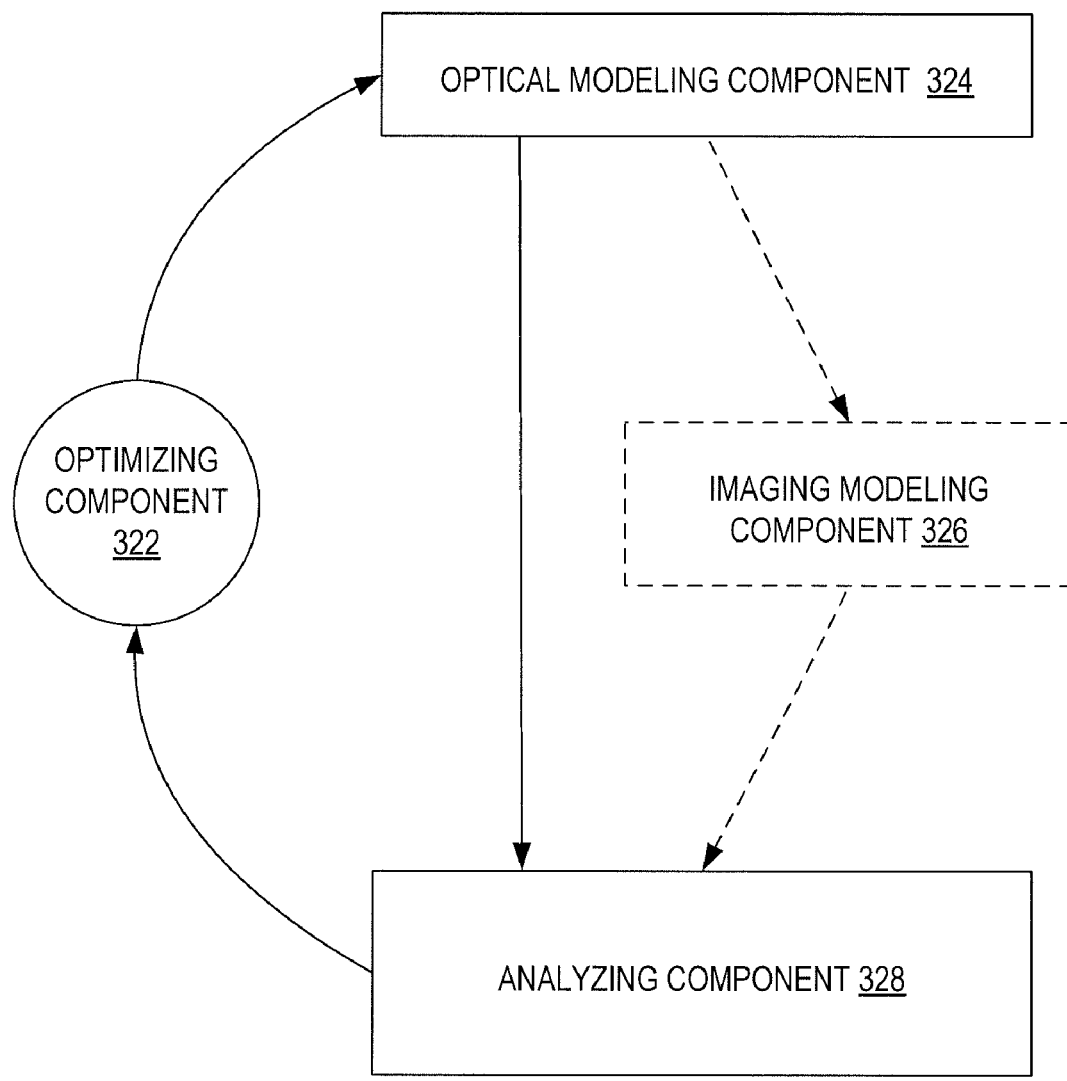
FIG. 10 illustrates exemplary relationships among components for optimizing optical and digital system designs, in accord with one embodiment.

FIG. 10 illustrates relationships among components, and functions of these components, as used in a design optimizing system (e.g., system 12(1), FIG. 2), in accord with one embodiment. An optical modeling component 324 models light or photon propagation through optical objects of an optical system. Optical modeling component 324 may be, for example, an interface to an external optical simulator 52 that models optical system model 17. Alternatively, optical modeling component 324 may be a component of design system 12 that performs optical modeling on optical system model 17 directly (i.e., without an external optical simulator, as discussed below with respect to FIG. 11).

Propagation data from optical modeling component 324 may pass to an optional imaging modeling component 326. Imaging modeling component 326 may be, for example, an interface to an external digital simulator 54 that models digital system model 18. Alternatively, imaging modeling component 326 may be signal processing component 76 and/or other components of design system 12 that perform digital modeling on digital system model 18 directly (i.e., without an external digital simulator, as discussed below with respect to FIG. 11). Imaging modeling component 326 may for example model (a) light propagation prior to detection by a detector, (b) detection by a detector (e.g., a FPA) or photosensitive media (e.g., photoresist, film), and/or (c) subsequent processing of data or images generated by detectors or media.

Data from optical modeling component 324 (and data from imaging modeling component 326, when used) passes to an analyzing component 328. Analyzing component 328 may, for example, represent analyzer component 78. Analyzed data from analyzing component 328 passes to an optimizing component 322. Optimizing component 322 may be, for example, optimization component 80. Optimizing component 322 may modify variables of an optical system model (e.g., optical system model 16) and initiate repetitive operation of modeling components 324 and 326, analysis component 328 and optimizing component 322, until the optical system model is optimized.

Figure 11:
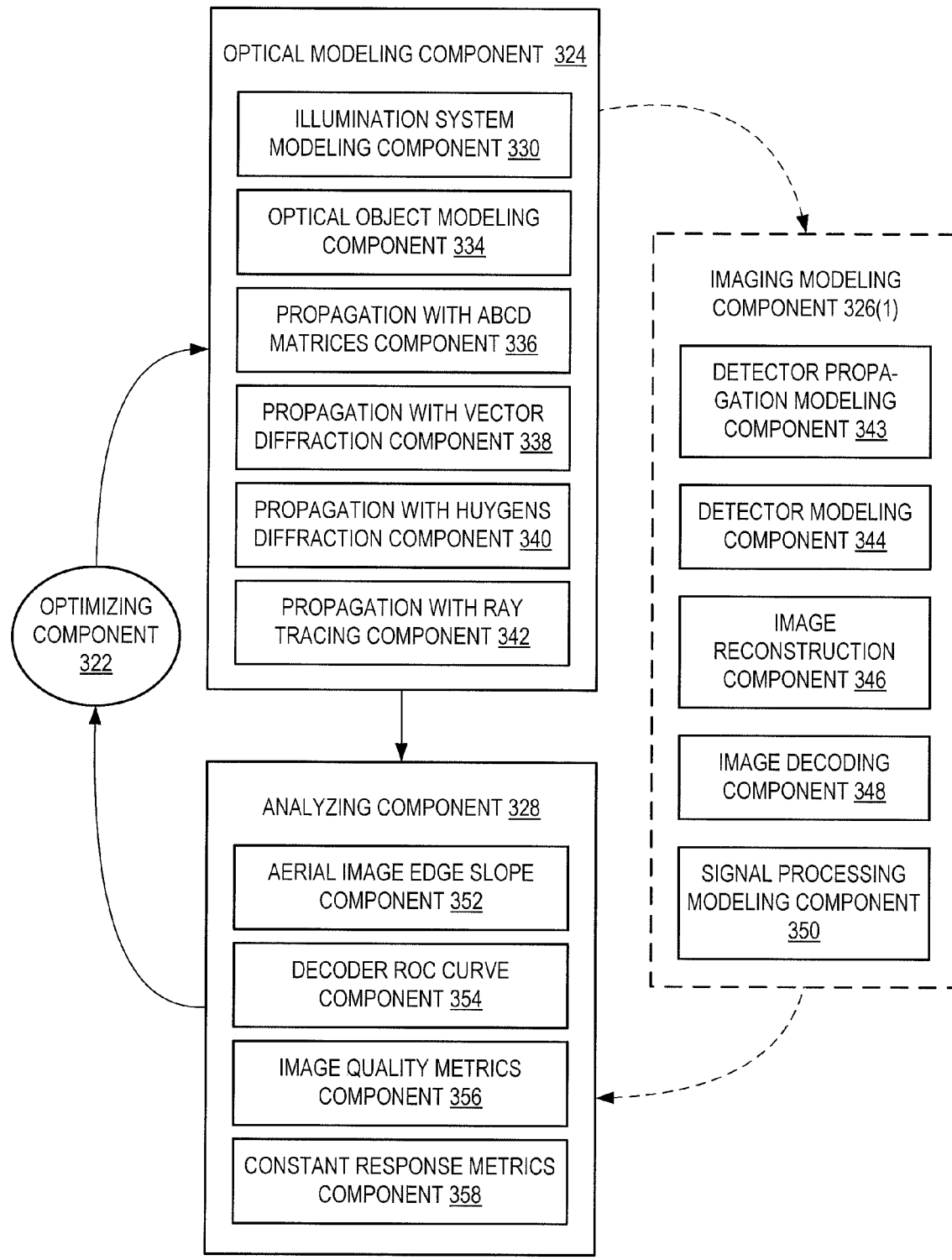
FIG. 11 shows exemplary detail of the relationships of FIG. 10, in accord with one embodiment.

FIG. 11 illustrates exemplary details of the components shown in FIG. 10. Optical modeling component 324 is shown including components that perform certain aspects of optical system modeling. For example, an optional illumination system modeling component 330 may model optical propagation to compute wavefront data (including, e.g., optical path difference maps, vignetting codes, internal reflection codes, and intensity maps) for illumination optics. An object modeling component 334 models propagation of light through objects (e.g., lenses, mirrors, filters, diffractive elements and other objects that form optical system model 17, FIG. 2). Object modeling component 334 or illumination system modeling component 330 may be an interface to an external optical simulator (e.g., external output component 82 to external optical simulator 52 of FIG. 4), or may be a custom or user-defined modeling component of design optimizing system 12 and may be based upon one or more component templates of toolbox 56 such as propagation template 62.

Propagation of light between optical design objects in an optical system model may be simulated in a number of ways by one or more components. For example, a propagation of ABCD matrices component 336 may model propagation through paraxial approximations; a vector diffraction component 338 may model polarization and complex valued wavefronts (i.e., component 338 models amplitude and phase of wavefronts); a propagation with Huygens diffraction component 340 may model propagation of individual point sources and add the results coherently; and a propagation with ray tracing component 342 may model trigonometric relationships and use Snell's law of refraction to trace individual rays through an optical system. Optical modeling component 324 may use one or more of propagation modeling components 336, 338, 340 and 342; output of optical modeling step 324 may include multiple sets of light propagation data and information that links each set of light propagation data to a specific propagation model.

An imaging modeling component 326(1) models imaging by a detector that generates electronic output. As discussed above, light propagation data from optical modeling component 324 is available for imaging modeling component 326(1). In the embodiment of FIG. 10, imaging modeling component 326(1) includes an optional detector propagation modeling component 343 that models light propagation within a detector system before the light energy is converted to an electronic signal (for example, light propagation within a microlens structure, microcavity, and/or an anti-reflection film of a detector).

A detector modeling component 344 models conversion of light to an electronic signal by an optoelectronic component, e.g., a photodetector or a FPA. In the case of an FPA, light is gathered at discrete spatial locations called pixels. Pixels may sample only certain wavelengths of light, including wavelengths that are visible and/or invisible (e.g., infrared, ultraviolet), or they may be broadband (i.e., sensitive to a wide range of wavelengths); wavelength sensitivity effects may be included in the modeling performed by detector modeling component 344. Component 344 may also perform noise modeling, since detectors may contain sources of noise. The act of sampling a discrete process (such as a FPA measuring the accumulation of photons, or such as a microbolometer measuring the accumulation of thermal energy) and conversion to electronic signals using circuitry also includes randomness; component 344 may also model this randomness.

Imaging modeling component 326(1) and the components within it may receive one or more types of data as input, and may output one or more types of data. For example, imaging modeling component 326(1) receives light propagation data from optical modeling component 324, and detector propagation modeling component 343 passes light propagation data to detector modeling component 344. Detector modeling component 344 may output modeled analog data or modeled digital data, corresponding to a detector being modeled.

Multiple views of modeled data may also pass among the components within, and may be output from, imaging modeling component 326(1). For example, multiple planes of modeled two dimensional wavefront data may exist; a group of two or more such planes is referred to herein as an "image stack". Each plane in an image stack represents a different configuration of optical modeling component 324, where configuration is set by variation of an optical system being modeled, or by use of different propagation modeling components 336, 338, 340, 342.

Imaging modeling component 326(1) may include other optional components. For example, an optional image reconstruction component 346 forms modeled image data for a specific task such as, for example, human visualization, machine vision or processing, decoding bar codes, optical character recognition or biometrics. An optional image decoding component 348 converts encoded data into data that may be analyzed by analysis 328; the encoded data may be purposefully encoded (as in a cryptographic system) or biologically encoded (as in iris codes in human eyes). An optional signal processing modeling component 350 models signal processing effects—such as nonlinear noise reduction, scaling, distortion or coordinate re-mapping, or high-level functions like feature detection and classification—on image data.

Either or both of optical modeling component 324 and imaging modeling component 326(1) may send data to an analyzing component 328. Data sent to analysis component 328 from imaging modeling component 326(1) may include modeled analog and/or digital data, statistics of image data, and/or a modeled image stack. Data sent to analyzing component 328 from optical modeling component 324 may include (a) parameters of an optical system being modeled, (b) light propagation data (e.g., the light propagation data that is also sent to analysis component 328), and (c) configuration data of optical modeling component 324; configuration data may include data of each configuration that corresponds to a plane in an image stack provided by imaging modeling component 326(1).

Analyzing component 328 accepts data from optical modeling component 324 and/or imaging modeling component 326(1), and passes figure of merit data to optimizing component 322. Analyzing component 328 may include an optional aerial image edge slope component 352 that measures sharpness of an edge of a PSF in an energy distribution just above a wafer in a lithographic process. The sharper the edge, the more consistent will be a pattern formed on the wafer.

Analyzing component 328 may also include an optional decoder ROC (receiver/operating characteristics) curve component 354 that indicates a degree of confidence that may be placed in a decoding algorithm, by comparing a probability of false alarm with a probability of detection. ROC characteristics, for example, may be given to optimizing component 322 as a measure of reliability of the image decoding component 348 which, in turn, may be a function of image reconstruction component 346 and modeling component 324.

Analyzing component 328 may also include an optional image quality metrics component 356 that provides a numerical evaluation of perceived image quality. Component 356 may, for example, calculate quality metrics related to human visual response, in which some wavelengths (colors) and spatial frequencies are attenuated while others are accentuated. Component 356 may also, for example, calculate features of an imaging system known to affect image quality, such as modulation at a given spatial frequency, and a radius of a first Airy disk in the PSF.

Analyzing component 328 may also include an optional constant response metrics component 358 that describes variation as a function of configuration (where configuration again means variation in optical modeling component 324). Metrics that may be calculated in component 358 include intensity variation, phase variation (spatial motion), signal-to-noise variation and aberration variation across configurations. Analyzing component 328 produces score data for optimizing component 322. The score data may be a single scalar value, or a vector or matrix of values for goals the optimizer tries to reach.

Optimizing component 322 makes changes to variable parameters of system models (e.g., optical system model 17 and/or digital system model 18). Optimizing component 322 determines changes by using algorithms such as a Nelder-Mead downhill simplex, a Genetic Algorithm or a Damped Least-Squares solution. Optimizing component 322 accepts figures of merit representing quality of an optical system design that are derived by analyzing component 328, from data passed by modeling component 324 and/or imaging component 326. Optimizing component 322 also determines when goals (e.g., goals 24) of a system design have been met.

Figure 12:
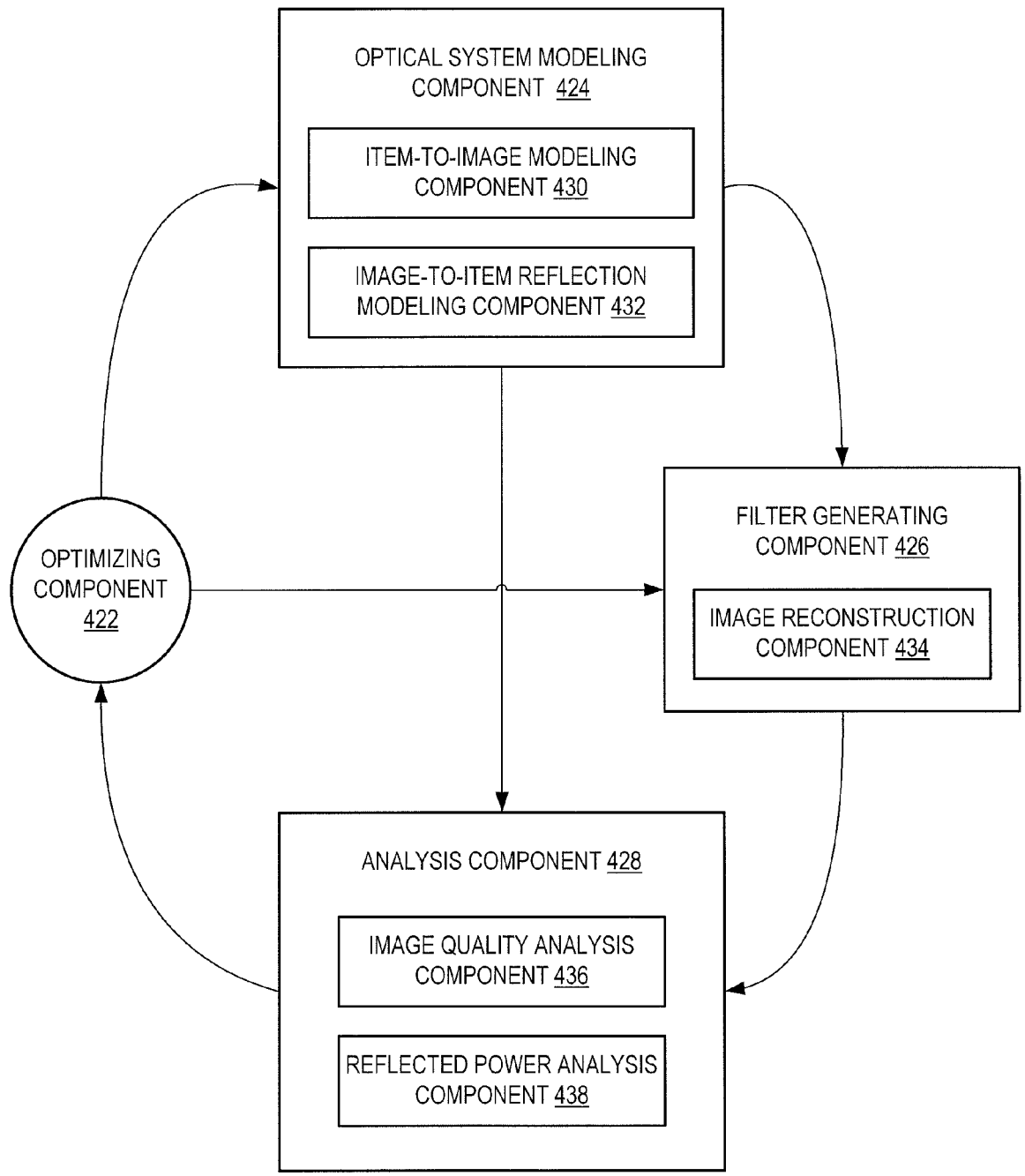
FIG. 12 is an operational diagram illustrating one exemplary design methodology for an anti-reflection system.

FIG. 12 illustrates relationships among components, and functions of these components, as used in a design optimizing system for designing an optical system that minimizes reflections from a detector to an imaged item, in accord with one embodiment. An optical system modeling component 424 uses an item-to-image modeling component 430 to model propagation and imaging of the item information to an image plane of an FPA, and an image-to-item modeling component 432 to model propagation of reflected illumination from the FPA to the item. Components 430 and 432 may use data of system designs (e.g., either of components 430 and/or 432 may be an external optical simulator 52, as discussed above, or may be custom or user-defined components, and may use data of optical system model 17). Item-to-image modeling component 430 and image-to-item modeling component 432 pass modeling data to an analysis component 428. Filter generating component 426 forms a filter; component 426 also includes an image reconstruction component 434. Analysis component 428 analyzes the detected image. An image quality analysis component 436 analyzes the filtered (i.e., reconstructed) image (e.g., by comparing the filtered image to a metric 20B(1)), and a reflected power analysis component 438 analyzes the reflected power (e.g., analyzes data from image-to-item modeling component 432 which represents reflections from the FPA to determine reflected power); analysis component 428 uses data from components 436 and 438 to form figure of merit data (e.g., a score) for optimizing component 422. Optimizing component 422 makes changes to variable parameters of a system model (e.g., parameters of optical system model 17 or digital model 18), and continues to make changes until the image quality (as modeled by component 430, filtered and reconstructed by component 426, and analyzed by component 436), and the image-to-item reflection (as modeled by component 432 and analyzed by component 438) all satisfy design goals.

FIG. 15 shows one exemplary optical system design 700 for an infrared seeker. System design 700 is, for example, suitable for optimization by design optimizing system 12(2), FIG. 4. Optical system design 700 is illustratively shown with a lens 702, an aperture stop 704 and a detector 708. Detector 708 is for example an un-cooled micro-bolometer. Detector 708 includes a germanium cover plate 706 and has a FPA 709. Germanium cover plate 706 may, for example, form a seal and optical window for detector 708. In particular, optical system design 700 includes wavefront coding on a surface 703 of lens 702.

The infrared seeker may operate with placement of detector 708 +/−100 m from a known best-focus position, over field angles of [x=0,y=0] and [x=0,y=0.8] millimeters in the image plane 709 (representing on-axis and full-vertical field), and for 8 μm, 10 μm, and 12 μm wavelengths. First order parameters for the single lens design include 11 mm focal length, F/0.9, nominal field-of-view +/−4 degrees, object distance 250 meters, optical total track less than 20 mm.

Optical design 700 may, for example, be simulated by external optical simulator 52. In this example, a reconstruction filter and image reconstruction is not utilized since no reconstructed image is required (output in this example is to indicate presence of a 'hot spot' in the field of view of optical system design 700). During optimization, however, digital processing may be used to calculate the power in the PSF by computing the inner-product of a lexicographically stacked numerical matrix representing the PSF.

The following three exemplary metrics, listed below, are configured within analyzer component 78 during optimization of optical system design 700. As appreciated, optimization of system design 700 may utilize more or fewer metrics as a matter of design choice.

Metric 1 Total power in the PSF
Metric 2 Minimum power in any PSF
Metric 3 Variance in power across all PSFs Metric 1, metric 2 and metric 3 may be configured to run in an external digital simulator (e.g., external digital simulator 54, FIG. 4), for example. In this example, code samples are include for execution by MATLAB. Code Sample 1 Metric 1 below shows exemplary code for metric 1.

---

Code Sample 1 Metric 1

```
function pwr = psfTotPower( psf )
    [M,N,P] = size( psf );
    pwr = 0;
    for k=1:P,
        tmp = psf(:,:,k);
        tmp = tmp(:) / sum(tmp(:));
        pwr = pwr + tmp' * tmp;
    end
```

---

In Code Sample 1 Metric 1, total power for a given set or stack of PSFs is determined by adding inner products of lexicographically stacked PSF data where the PSFs are from the various optical configurations. This value is utilized by analyzer component 78 when determining a score for output to optimizer component 80, for example.

Code Sample 2 Metric 2 shows exemplary code for metric 2.

---

Code Sample 2 Metric 2

```
function pwr = psfMinPower( psf )
    [M,N,P] = size( psf );
    pwr = inf;
```

-continued

Code Sample 2 Metric 2

```
for k=1:P,
    tmp = psf(:,:,k);
    tmp = tmp(:) / sum(tmp(:));
    pwr = min( pwr, tmp' * tmp );
end
```

In Code Sample 2 Metric 2, minimum power for a given set or stack of PSFs is determined by finding the minimum of the inner products of lexicographically stacked PSF data where the PSFs are from the various optical configurations. This value is utilized by analyzer component 78 when determining a score for output to optimizer component 80, for example.

Code Sample 3 Metric 3 shows exemplary code for metric 3.

Code Sample 3 Metric 3

```
function pwr = psfVarPower( psf )
    [M,N,P] = size( psf );
    pwr = inf;
    for k=1:P,
        tmp = psf(:,:,k);
        tmp = tmp(:) / sum(tmp(:));
        pwr(k) = tmp' * tmp;
    end
    pwr = var(pwr);
```

In Code Sample 3 Metric 3, variation in power in a set or stack of PSFs is determined by calculating the variance in the inner products of lexicographically stacked PSF data where the PSFs are from the various optical configurations. This value is utilized by analyzer component 78 when determining a score for output to optimizer component 80, for example.

Analyzer component 78 may combine results from metrics 1-3 into a single score which it passes to optimizer component 80. For example, analyzer component 78 may apply weights to, or scale, each result to determine the score. The operator or designer may, for example, define the weight of each result, or the weight may be determined algorithmically. Optimizer component 80 then adjusts parameters of surface 703 to obtain goals of optical system design 700. These goals may be, for example, high power, high minimum power, and low variance. Thus, in this example, optimizer component 80 attempts to maximize the power value output from metric 1, maximize the minimum PSF power output from metric 2, and minimize the variance in PSF powers output from metric 3. These goals are suitable for a seeker/detection algorithm that relies on a maximized signal-to-noise ratio, or on the signal strength defined as the inner product of the PSF when the noise power is constant.

Figure 16:
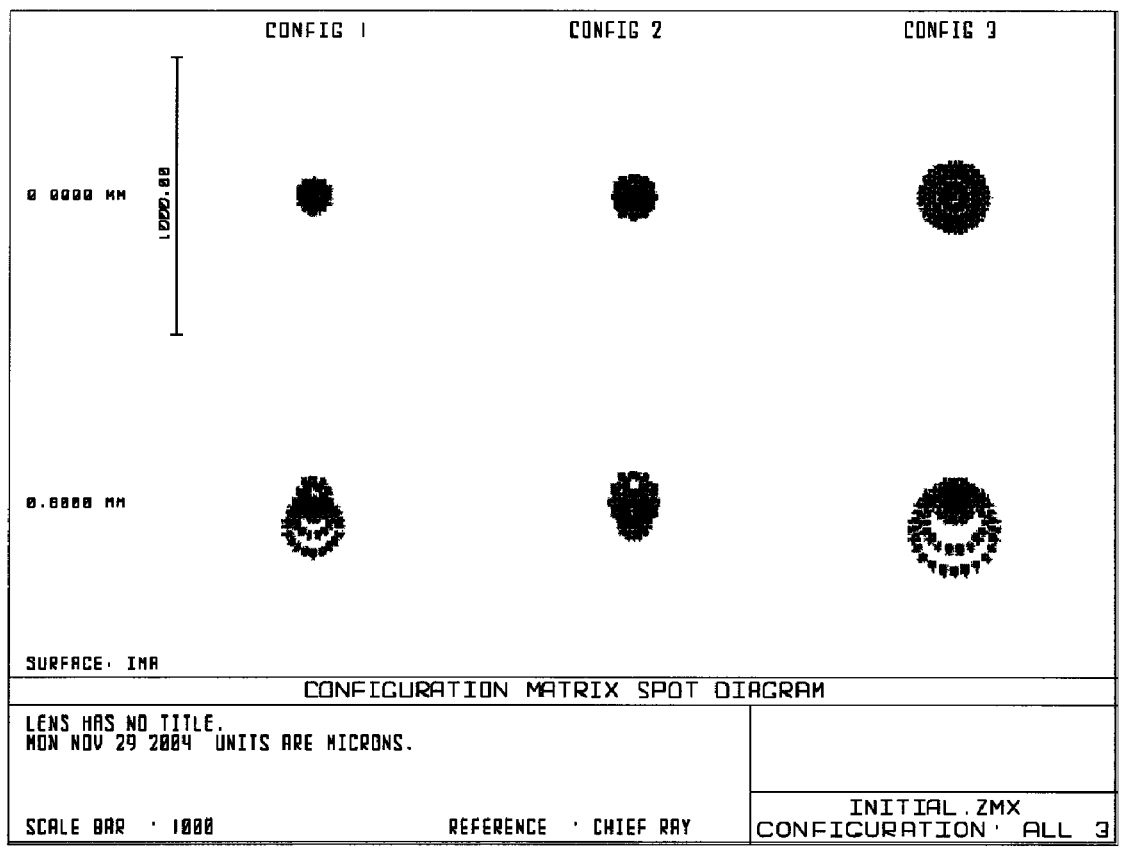
FIG. 16 shows exemplary spot diagrams determined from the optical system design of FIG. 15, without wavefront coding.
Figure 17:
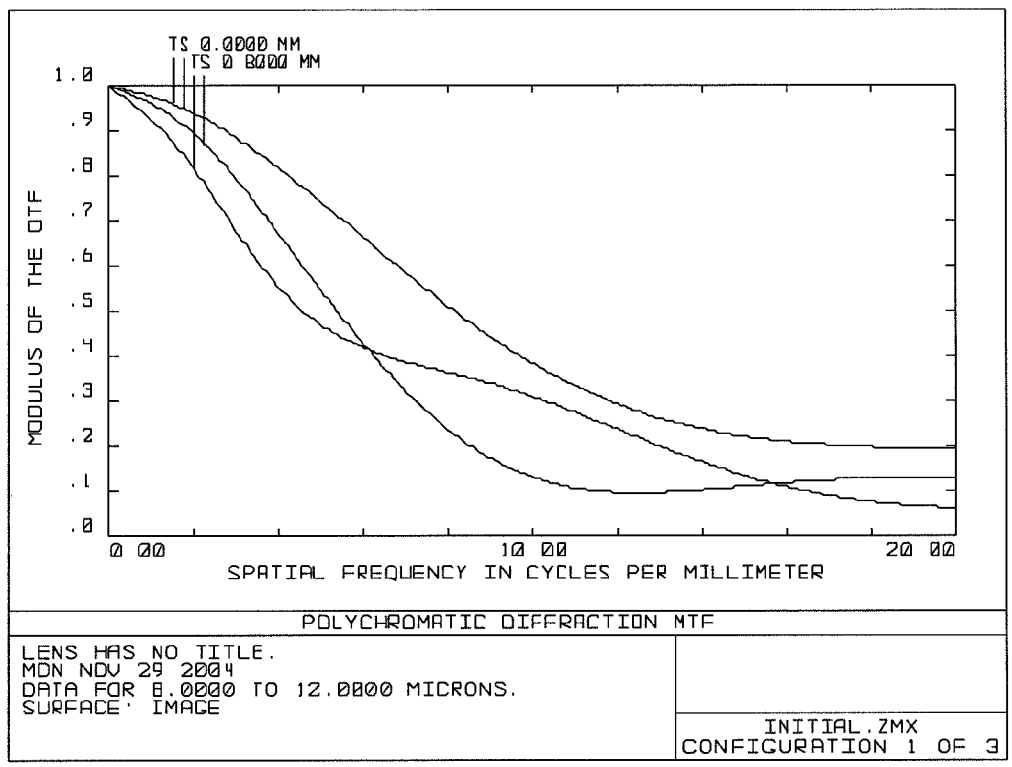
FIG. 17 shows one exemplary polychromatic diffraction MTF for tangential and saggital field points in the image plane with the detector positioned in best focus for the optical system design of FIG. 15, without wavefront coding.
Figure 18:
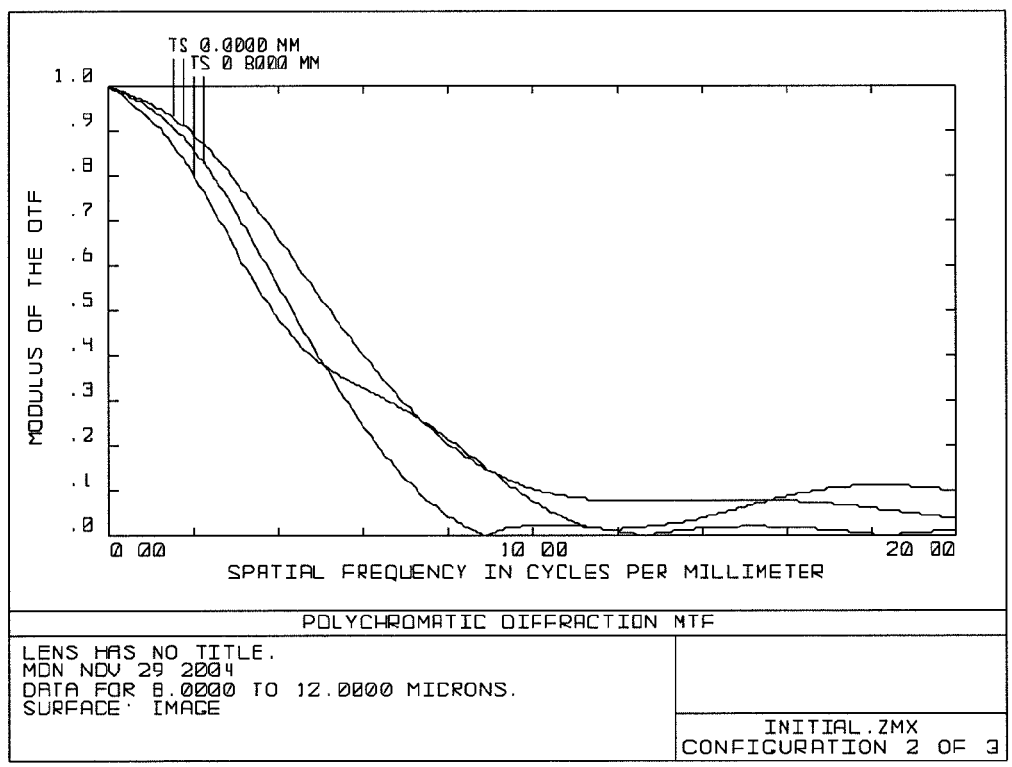
FIG. 18 shows one exemplary polychromatic diffraction MTF for tangential and saggital field points in the image plane with the detector positioned −100 µm from best focus for the optical system design of FIG. 15, without wavefront coding.
Figure 19:
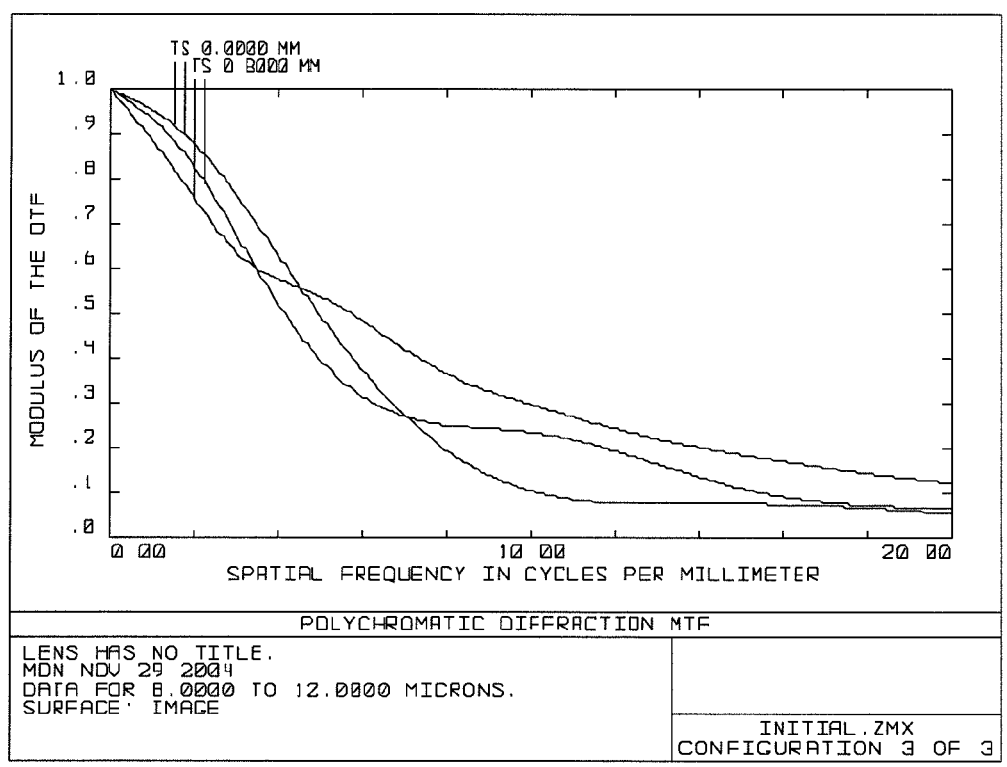
FIG. 19 shows one exemplary polychromatic diffraction MTF for tangential and saggital field points in the image plane with the detector positioned +100 µm from best focus for the optical system design of FIG. 15, without wavefront coding.

FIG. 16 shows exemplary spot diagrams determined from optical system design 700, FIG. 15, without wavefront coding. Each spot diagram contains three wavelengths denoted with symbols ('+'=8 µm, 'x'=10 µm, 'square'=12 µm) across configurations 1-3 for −100 µm, best-focus, and +100 µm, respectively, and for on-axis (upper row of spot diagrams) and off-axis (lower row of spot diagrams). FIG. 17 shows one exemplary polychromatic (8 µm-12 µm wavelengths) diffraction MTF for tangential (T) and saggital (S) field points [x=0,y=0] and [x=0,y=0.8] mm in the image plane with detector 708 positioned in best focus. FIG. 18 shows one exemplary polychromatic (8 µm-12 µm wavelengths) diffraction MTF for tangential (T) and saggital (S) field points [x=0,y=0] and [x=0,y=0.8] mm in the image plane with detector 708 positioned −100 µm from best focus. FIG. 19 shows one exemplary polychromatic (8 µm-12 µm wavelengths) diffraction MTF for tangential (T) and saggital (S) field points [x=0,y=0] and [x=0,y=0.8] mm in the image plane with detector 708 positioned +100 µm from best focus. In FIG. 17-FIG. 18, it is evident that the MTF varies with detector placement. In FIG. 18 it is evident that the saggital (S) full-field MTF has a null just below 10 cycles per millimeter and stays very near zero between 10 and 20 cycles per millimeter.

Figure 20:
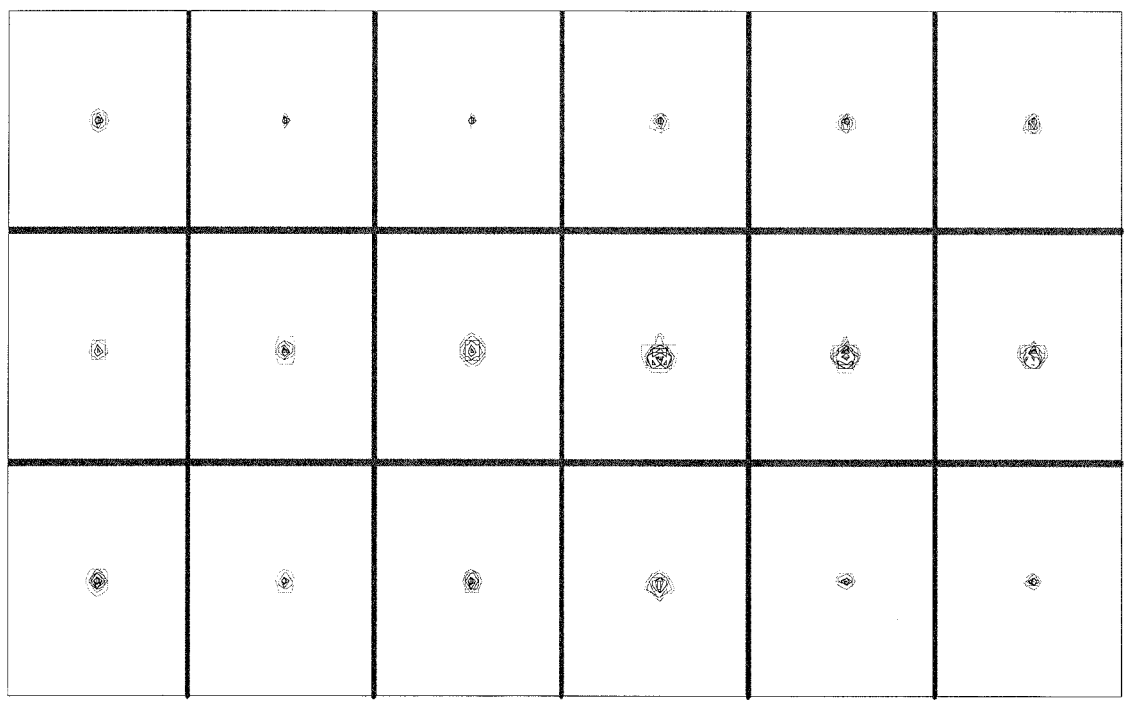
FIG. 20 shows exemplary PSFs for the optical system design of FIG. 15, without wavefront coding and for +/−100 µm placement of the detector.

FIG. 20 shows exemplary PSFs for optical system design 700 without wavefront coding for +/−100 µm placement of the detector 708. FIG. 20 is similar to FIG. 16 except that FIG. 20 shows the digital PSFs after the sampling process by detector 708. It is evident in FIG. 20 that variation in PSFs can be "seen" by the detector since the variations are larger than a single pixel; otherwise the PSFs would appear identically. The PSFs are from left-to-right, top-row for −100 µm placement of detector 708 on-axis (left half) for 8 µm, 10 µm, 12 µm and off-axis (right half) for the same wavelengths; middle row is best-focus; bottom row is +100 um detector 708 placement.

Figure 21:
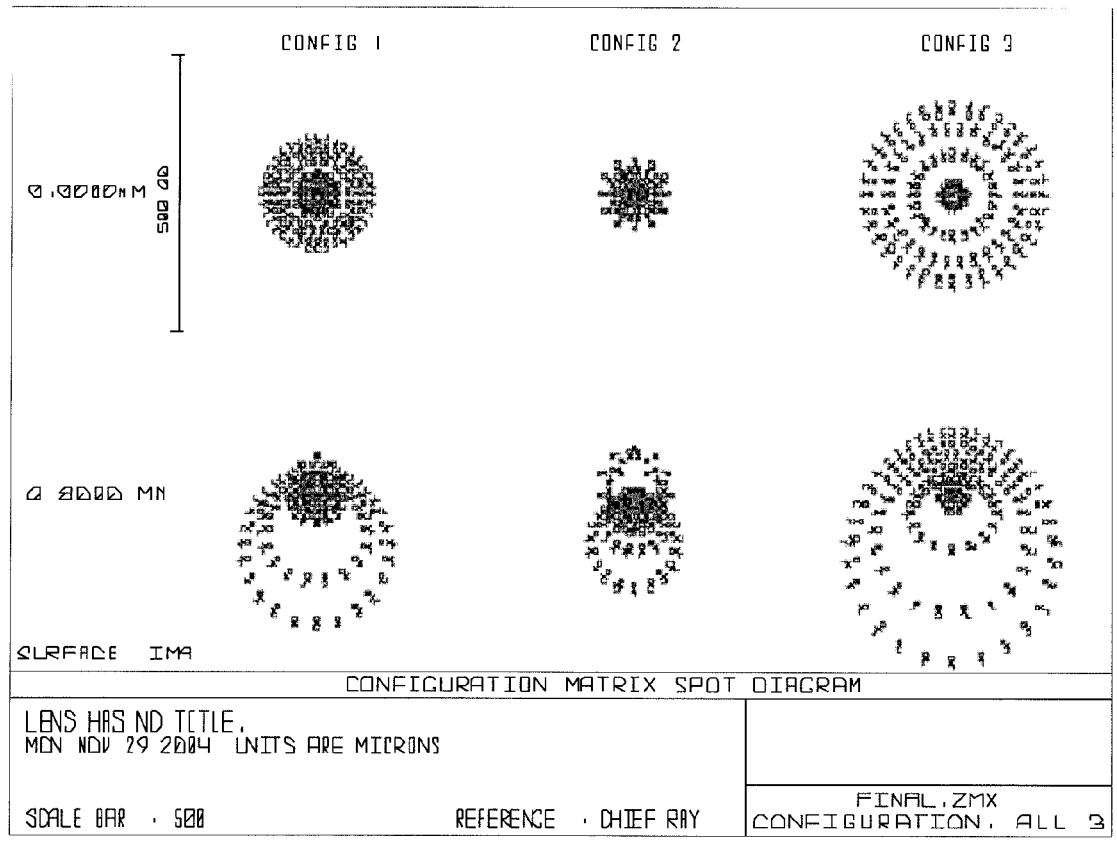
FIG. 21 shows exemplary spot diagrams determined from optical system design of FIG. 15, with optimized wavefront coding.
Figure 22:
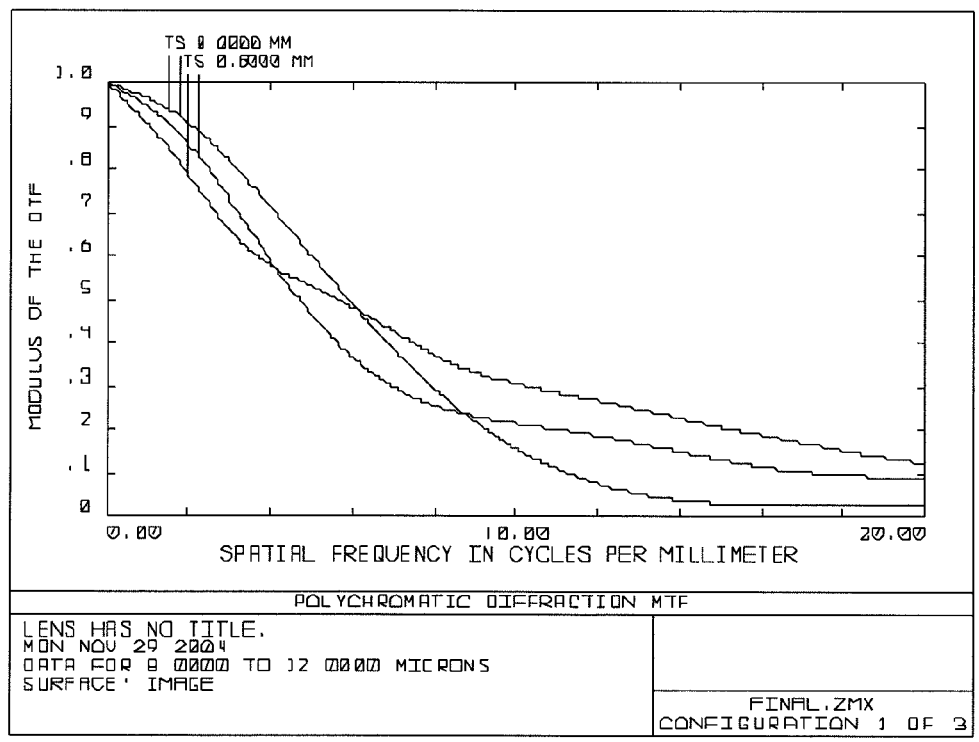
FIG. 22 shows one exemplary polychromatic diffraction MTF for tangential and saggital field points in the image plane with the detector positioned in best focus of optical system design of FIG. 15, with optimized wavefront coding.
Figure 23:
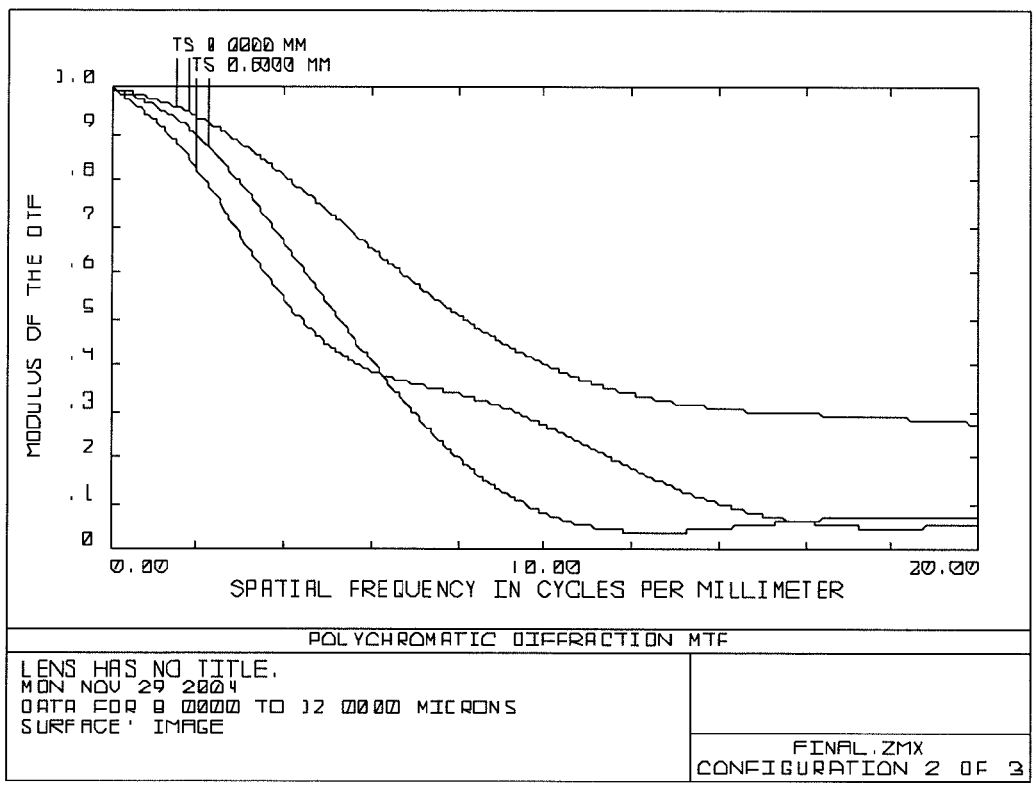
FIG. 23 shows one exemplary polychromatic diffraction MTF for tangential and saggital field points in the image plane with the detector positioned −100 µm from best focus of optical system design of FIG. 15, with optimized wavefront coding.
Figure 24:
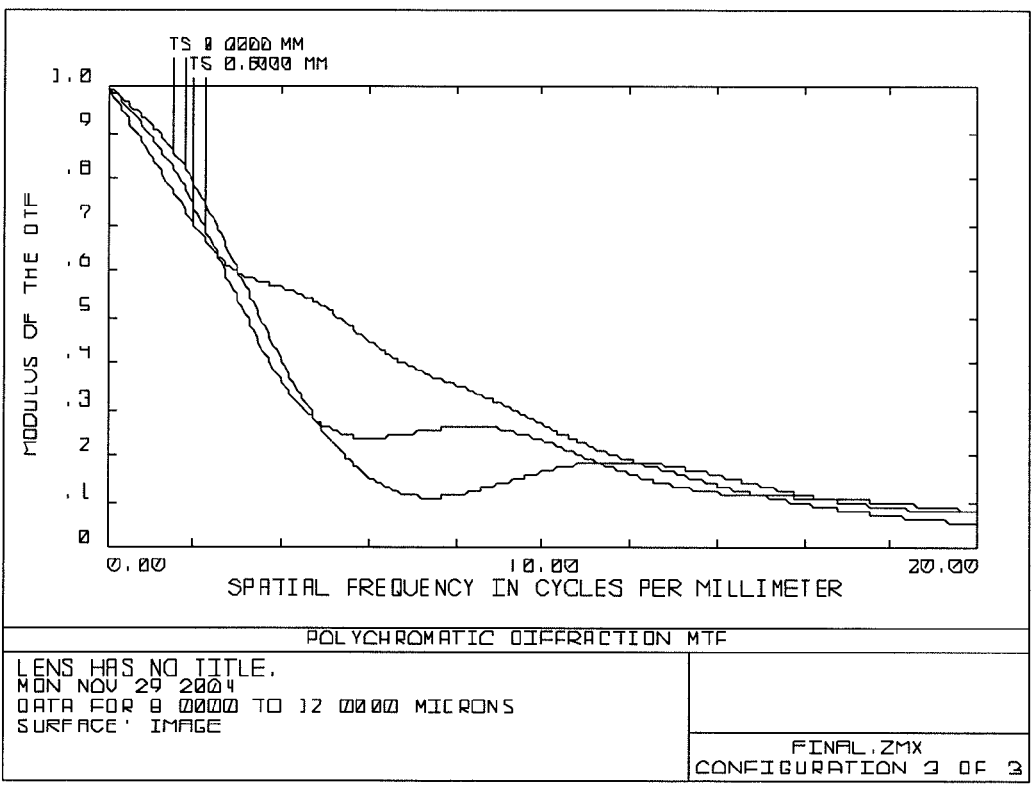
FIG. 24 shows one exemplary polychromatic diffraction MTF for tangential and saggital field points in the image plane with the detector positioned +100 µm from best focus of optical system design of FIG. 15, with optimized wavefront coding.

FIG. 21 shows exemplary spot diagrams determined from optical system design 700, FIG. 15, with optimized wavefront coding (i.e., after optimization by design optimization system 12(2), FIG. 4). Each spot diagram contains three wavelengths denoted with symbols ('+'=8 µm, 'x'=10 µm, 'square'=12 µm) across configurations 1-3 for −100 µm, best-focus, and +100 µm, respectively, and for on-axis (upper row of spot diagrams) and off-axis (lower row of spot diagrams). FIG. 22 shows one exemplary polychromatic (8 µm-12 µm wavelengths) diffraction MTF for tangential (T) and saggital (S) field points [x=0,y=0] and [x=0,y=0.8] mm in the image plane with detector 708 positioned in best focus. FIG. 23 shows one exemplary polychromatic (8 µm-12 µm wavelengths) diffraction MTF for tangential (T) and saggital (S) field points [x=0,y=0] and [x=0,y=0.8] mm in the image plane with detector 708 positioned −100 µm from best focus. FIG. 24 shows one exemplary polychromatic (8 µm-12 µm wavelengths) diffraction MTF for tangential (T) and saggital (S) field points [x=0,y=0] and [x=0,y=0.8] mm in the image plane with detector 708 positioned +100 µm from best focus. In FIG. 22-FIG. 24, it is evident that the MTF varies less with detector placement than in FIG. 16-FIG. 18: at no point do the polychromatic MTFs have a zero before 20 cycles per millimeter. The MTFs also stay well above zero between 10 and 20 cycles per millimeter as compared to FIG. 18 prior to optimization.

Figure 25:
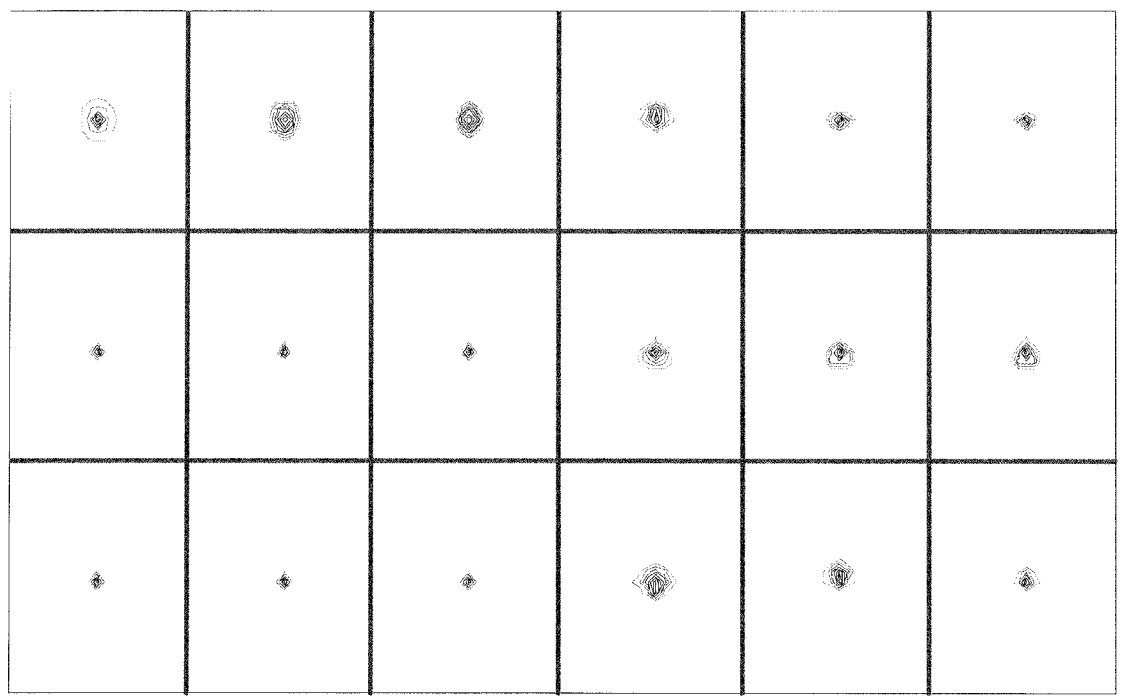
FIG. 25 shows exemplary PSFs for the optical system design of FIG. 15, with optimized wavefront coding for +/−100 µm placement of the detector.

FIG. 25 shows exemplary PSFs for optical system design 700 with optimized wavefront coding for +/−100 µm placement of the detector 708. It is evident in FIG. 25 that, while variation in PSFs can be "seen" by the detector because the variations are larger than a single pixel, the PSFs are more similar than in FIG. 20 as measured by the weighted merit function described by Code Samples 1 through 3. The PSFs in FIG. 25 are from left-to-right, top-row for −100 µm placement of detector 708 on-axis (left half) for 8 µm, 10 µm, 12 µm and off-axis (right half) for the same wavelengths; middle row is best-focus; bottom row is +100 um detector 708 placement.

Equation of surface 703 prior to optimization:

$$\text{Sag}(r, t) = \frac{cr^2}{1 + \sqrt{1 - (1+k)c^2 r^2}}$$

where
c=1.47852e-1 l/mm
k=−4.10583 mm
|r|<=4.61918, 0<=t<2 pi

In this example, after optimization, surface 703 may be defined as:

$$\mathrm{Sag}(r, t) = \frac{cr^2}{1 + \sqrt{1 - (1+k)c^2 r^2}} + A_2 r^2 + A_4 r^4 + A_6 r^6 + A_8 r^8$$

where
c=1.47852e-1 l/mm
k=−4.10583 mm
|r|<=4.61918, 0<=t<2 pi
$A_2$=−8.0720e-9
$A_4$=3.529243e-8
$A_6$=1.422329e-9
$A_8$=5.397160e-11

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A software product comprising instructions stored on computer-readable storage media, wherein the instructions, when executed by a computer, perform steps for optimizing an optical system design and a digital system design, the instructions comprising:
   instructions for simulating an optical model of the optical system design;
   instructions for simulating a digital model of the digital system design;
   instructions for analyzing simulated output of the optical model and simulated output of the digital model, to produce a score;
   instructions for modifying the optical model and the digital model, based upon the score;
   instructions for controlling re-execution of the instructions for simulating the optical model, the instructions for simulating the digital model, the instructions for analyzing and the instructions for modifying to produce an optimized optical model and an optimized digital model; and
   instructions for outputting predicted performance of the optimized optical and digital models.

2. The software product of claim 1, wherein the instructions for controlling re-execution cause re-execution to continue until goals of the optical and digital system designs are achieved.

3. The software product of claim 1, further comprising instructions for initiating, from an external simulator, execution of one or more of (a) the instructions for simulating the optical model, (b) instructions for simulating the digital model, (c) the instructions for analyzing, and (d) the instructions for modifying.

4. The software product of claim 1, the instructions for analyzing comprising instructions for operating an external optical simulator and an external digital simulator to analyze simulated outputs of the optical and digital models, respectively, to produce the score.

5. The software product of claim 1, further comprising instructions for implementing a plurality of components within a graphical user interface, wherein the components control execution of (a) the instructions for simulating an optical model, (b) the instructions for simulating a digital model, (c) the instructions for analyzing and (d) the instructions for modifying, and further comprising instructions for sharing data between components selectively.

6. The software product of claim 1, the instructions for modifying further comprising instructions for balancing aberrations.

7. The software product of claim 1, the instructions for modifying further comprising instructions for implementing phase optics within the optical model.

8. The software product of claim 1, the instructions for modifying comprising instructions for operating an external optical simulator and an external digital simulator to modify one or both of the optical and digital models.

9. The software product of claim 1, the instructions for analyzing comprising calculating a modulation transfer function, the instructions for outputting predicted performance comprising instructions for outputting the modulation transfer function.

10. The software product of claim 1, further comprising
    instructions for outputting the optimized optical model; and
    instructions for outputting the optimized digital model.

11. The software product of claim 10, wherein the instructions for outputting the optimized optical model comprise instructions for preparing and exporting one or more scripts for a computer numeric controlled tool.

12. The software product of claim 10, wherein the instructions for outputting the optimized optical model comprise instructions for outputting a lens file that includes surface descriptions, thickness, materials and distances.

13. The software product of claim 12, wherein the instructions for outputting the lens file includes instructions for outputting tolerances of one or more of the surface descriptions, thickness, materials and distances.

14. A software product comprising instructions stored on computer-readable storage media, wherein the instructions, when executed by a computer, perform steps for optimizing an optical system design and a digital system design, the instructions comprising:
    instructions for simulating an optical model of the optical system design, the instructions for simulating the optical model comprising instructions for operating an external optical simulator;
    instructions for simulating a digital model of the digital system design;
    instructions for analyzing simulated output of the optical model and simulated output of the digital model, to produce a score; and
    instructions for modifying the optical model and the digital model, based upon the score.

15. The software product of claim 14, the instructions for analyzing comprising instructions for comparing the simulated output of the optical model and the simulated output of the digital model against one or more metrics defined by the goals, to produce one or more results, and further comprising instructions for processing the results to produce the score.

16. The software product of claim 14, the instructions for simulating the digital model comprising instructions for operating an external digital simulator.

17. The software product of claim 14, the instructions for modifying comprising instructions for modifying the optical model and the digital model based upon the score and previous modifications of the optical and digital models.

18. The software product of claim 14, the instructions for analyzing comprising instructions for controlling the external optical simulator to analyze simulated output of the optical model, to produce the score.

19. The software product of claim 14, the instructions for analyzing comprising instructions for controlling an external digital simulator to analyze simulated output of the digital model, to produce the score.

20. The software product of claim 14, the instructions for modifying comprising instructions for operating the external optical simulator and an external digital simulator to modify one or both of the optical and digital models.

* * * * *